(12) United States Patent
Hang et al.

(10) Patent No.: US 11,540,267 B2
(45) Date of Patent: Dec. 27, 2022

(54) DCI DETECTION METHOD, PDCCH CONFIGURATION METHOD, AND COMMUNICATIONS APPARATUS

(71) Applicant: HUAWEI TECHNOLOGIES CO., LTD., Guangdong (CN)

(72) Inventors: Haicun Hang, Shanghai (CN); Shibin Ge, Shanghai (CN); Xiaohan Wang, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 17/172,227

(22) Filed: Feb. 10, 2021

(65) Prior Publication Data

US 2021/0168775 A1 Jun. 3, 2021

Related U.S. Application Data

(63) Continuation of application No. PCT/CN2019/099588, filed on Aug. 7, 2019.

(30) Foreign Application Priority Data

Aug. 10, 2018 (CN) .......................... 201810910875.3

(51) Int. Cl.
*H04W 72/04* (2009.01)
*H04L 1/00* (2006.01)
*H04L 5/00* (2006.01)

(52) U.S. Cl.
CPC ......... *H04W 72/042* (2013.01); *H04L 1/0038* (2013.01); *H04L 5/0053* (2013.01)

(58) Field of Classification Search
CPC ..... H04L 1/0038; H04L 1/0039; H04L 5/001; H04L 5/0023; H04L 5/0094
See application file for complete search history.

(56) References Cited

U.S. PATENT DOCUMENTS

| | | |
|---|---|---|
| 2015/0257086 A1 | 9/2015 | Jiang et al. |
| 2015/0334660 A1* | 11/2015 | Hsieh .................. H04W 72/042 370/328 |

(Continued)

FOREIGN PATENT DOCUMENTS

| | | |
|---|---|---|
| CN | 103716121 A | 4/2014 |
| CN | 106454901 A | 2/2017 |

(Continued)

OTHER PUBLICATIONS

Office Action issued in Chinese Application No. 201810910875.3 dated Feb. 10, 2021, 17 pages (with English translation).

(Continued)

*Primary Examiner* — Ayaz R Sheikh
*Assistant Examiner* — Debebe A Asefa
(74) *Attorney, Agent, or Firm* — Fish & Richardson P.C.

(57) ABSTRACT

Methods, systems, and apparatus for downlink control information (DCI) detection are provided. In one aspect, a DCI detection method includes: receiving a configuration parameter that is used to configure at least one or more groups of candidate resources, each of the one or more groups of candidate resources carrying one piece of DCI, and in response to determining that one corresponding piece of DCI is blindly detected from one of the one or more groups of candidate resources, stopping the blind detection on the one of the one or more groups of candidate resources.

14 Claims, 4 Drawing Sheets

(56) References Cited

U.S. PATENT DOCUMENTS

2018/0192405 A1    7/2018  Gong et al.
2021/0028961 A1*   1/2021  Lee ..................... H04W 24/08

FOREIGN PATENT DOCUMENTS

| CN | 107734666 A | 2/2018 |
| CN | 108347778 A | 7/2018 |
| WO | 2018126782 A1 | 7/2018 |

OTHER PUBLICATIONS

PCT International Search Report and Written Opinion issued in International Application No. PCT/CN2019/099588 dated Oct. 29, 2019, 15 pages (with English translation).
Extended European Search Report issued in European Application No. 19846014.9 dated Sep. 16, 2021, 7 pages.

* cited by examiner

DCI DETECTION METHOD, PDCCH CONFIGURATION METHOD, AND COMMUNICATIONS APPARATUS

CROSS-REFERENCE TO RELATED APPLICATIONS

This application is a continuation of International Application No. PCT/CN2019/099588, filed on Aug. 7, 2019, and claims priority to Chinese Patent Application No. 201810910875.3, filed on Aug. 10, 2018. The disclosures of the aforementioned applications are hereby incorporated by reference in their entireties.

TECHNICAL FIELD

This application relates to the communications field, and more specifically, to a downlink control information (downlink control information, DCI) detection method, a downlink control channel (physical downlink control channel, PDCCH) configuration method, and a communications apparatus.

BACKGROUND

In a future 5th generation mobile communications technology (5th-generation, 5G), with rapid development in mobile communications, higher requirements are imposed on aspects such as a system capacity, an instantaneous peak rate, spectral efficiency, a throughput of a cell edge user, and a delay. Therefore, a coordinated multipoint transmission/reception (coordinated multiple points transmission/reception, CoMP) technology is proposed.

The CoMP technology aims to implement cooperative transmission between transfer points at different geographical locations. Currently, the CoMP technology can be used to improve system performance in both uplink and downlink, especially to improve spectral efficiency at a cell edge. Current mainstream implementations of the CoMP technology may be classified into a joint processing (joint processing, JP) technology and a coordinated scheduling/coordinated beamforming (coordinated scheduling/beamforming, CS/CB) technology.

In a multipoint transmission scenario, transfer points may separately send downlink control information DCI to a terminal device. When the terminal device is moved, a transmission mode of the terminal device may be switched back and forth between a multipoint transmission mode and a single-station transmission mode. In the multipoint transmission mode, the terminal device may receive DCI separately sent by a plurality of transfer points, that is, the terminal device needs to blindly detect a plurality of pieces of DCI. In the single-station transmission mode, the terminal device receives DCI sent by a single transfer point, that is, the terminal device needs to blindly detect one piece of DCI.

However, in the conventional technology, the terminal device does not know a current transmission mode. Therefore, the terminal device does not know a specific quantity of pieces of DCI. In this case, the terminal device can only perform blind detection on locations in all possible search spaces, to correctly detect all DCI. As a result, such operation greatly increases complexity of the blind detection performed by the terminal device.

Therefore, how to reduce complexity of blind detection becomes an urgently to-be-resolved problem.

SUMMARY

This application provides a DCI detection method, a PDCCH configuration method, and a communications apparatus, to reduce complexity of blind detection.

According to a first aspect, a downlink control information DCI detection method is provided. The method includes:

receiving a configuration parameter, where the configuration parameter is used to configure at least one group of candidate resources, and each group of candidate resources carries one piece of DCI; and when one piece of DCI is blindly detected from each group of candidate resources, stopping the blind detection on the group of candidate resources.

According to a second aspect, a downlink control channel PDCCH configuration method is provided. The method includes:

generating a configuration parameter, where the configuration parameter is used to configure at least one group of candidate resources, and each group of candidate resources carries one piece of DCI; and sending the configuration parameter to a terminal device.

Specifically, in the conventional technology, regardless of a quantity of pieces of DCI, a network side device configures only one group of candidate resources, and the terminal device needs to perform blind detection on all candidate resources to ensure correct detection of the DCI.

In this embodiment of this application, candidate resources are grouped by using the configuration parameter, and each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

It should be understood that, in this embodiment of this application, the network side device that generates the configuration parameter may be any network device that communicates with the terminal device. For example, the configuration parameter may be generated by a first network device or a second network device. Optionally, the network side device that generates the configuration parameter may be alternatively a first network device and a second network device. For example, the first network device and the second network device negotiate with each other to generate the configuration parameter. This embodiment of this application is not limited thereto. It should be further understood that, in this embodiment of this application, a network device that sends the configuration parameter and a network device that generates the configuration parameter may be a same network device or may be different network devices. This embodiment of this application is not limited thereto.

In this embodiment of this application, the configuration parameter indicates parameter information that is used to obtain DCI and that is of a candidate resource. The network side device (for example, the first network device or the second network device) may send the configuration parameter to the terminal device by using signaling. It should be understood that, in this embodiment of this application, the configuration parameter may also be referred to as a configuration field, an information element (information element, IE), or the like. This embodiment of this application is not limited thereto.

It should be understood that, in this embodiment of this application, the candidate resource indicates a resource that can carry DCI. The terminal device needs to perform blind detection on the candidate resource to obtain the DCI.

Usually, the DCI includes a cyclic redundancy check (cyclic redundancy check, CRC) field. The CRC field is scrambled based on a radio network temporary identifier (radio network temporary identity, RNTI) of the terminal device in the DCI. In this case, the terminal device may perform blind detection based on the CRC in the DCI to determine the DCI sent to the terminal device. Usually, the RNTI may be specifically divided into a plurality of types. The plurality of types may be, for example but not limited to, a temporary configure RNTI (temporary configure RNTI, TC-RNTI) and a cell RNTI (cell RNTI, C-RNTI). Related content about the DCI and the CRC of the DCI has been clearly described in the conventional technology. Details are not described herein.

In this embodiment of this application, the configuration parameter may have a plurality of forms. The configuration parameter may be a bandwidth part-downlink dedicated (bandwidth part (BWP)-DownlinkDedicated) parameter or a downlink control channel configuration (physical downlink control channel config, PDCCH-Config) parameter.

Specifically, in this embodiment of this application, BWP-DownlinkDedicated is used to set up or release PDCCH-Config, and a parameter included in PDCCH-Config is used to detect a candidate downlink control channel (physical downlink control channel, PDCCH). PDCCH-Config may include a control resource set (control resource sets, CORESET) configuration parameter and a search space (search space) configuration parameter. The CORESET may be referred to as a control resource set, that is, a time-frequency resource of the CORESET, for example, a size of a resource block occupied by DCI in frequency domain or a quantity of symbols occupied in time domain; or may be referred to as a control resource set configuration parameter, that is, a parameter that is related to a signaling configuration and that is used to obtain a time-frequency resource of the CORESET. The search space may be referred to as a search space configuration parameter, that is, a parameter related to a signaling configuration. The parameter is used to obtain a time and a manner of searching for a candidate or a possible PDCCH. For example, the search space may indicate a possible location of a start symbol of DCI, or the search space may directly indicate a place for detecting a candidate PDCCH or a place on which detection needs to be performed.

The following describes examples of cases of the configuration parameter in this embodiment of this application.

With reference to the first aspect or the second aspect, in an implementation, the configuration parameter is used to set up one or more downlink control channel configurations: or the configuration parameter is used to release one or more downlink control channel configurations.

Each downlink control channel configuration is used to configure one group of candidate resources.

It should be understood that, in this embodiment of this application, after the terminal device completes setting up the downlink control channel configuration, the terminal device obtains at least one downlink control channel configuration in total; or after the terminal device completes releasing the downlink control channel configuration, the terminal device obtains at least one downlink control channel configuration in total.

For example, the configuration parameter may be BWP-DownlinkDedicated, and the downlink control channel configuration may be PDCCH-Config. BWP-DownlinkDedicated is used to set up or release the downlink control channel configuration PDCCH-Config. Each PDCCH-Config is used to configure one group of candidate resources, and each PDCCH-Config may correspond to one network device. DCI sent by the network device is carried on the group of candidate resources configured by using PDCCH-Config.

It should be understood that, in this embodiment of this application, different PDCCH-Config parameters may correspond to different network devices, or different PDCCH-Config parameters may correspond to a same network device. This embodiment of this application is not limited thereto.

When different PDCCH-Config parameters correspond to different network devices, different pieces of DCI come from different network devices.

When two or more different PDCCH-Config parameters correspond to a same network device, two or more pieces of DCI corresponding to the two or more PDCCH-Config parameters come from the same network device.

Usually, in an existing solution, for both a single piece of DCI and a plurality of pieces of DCI, BWP-DownlinkDedicated includes only one PDCCH-Config parameter, and the PDCCH-Config parameter is used to configure one group of candidate resources. Because the terminal device does not know a quantity of pieces of DCI carried on the group of candidate resources, accuracy of blind detection of DCI can be ensured only after blind detection is performed on all candidate resources in the group of candidate resources. In this embodiment of this application, the configuration parameter may be configured with at least one PDCCH-Config parameter. One PDCCH-Config parameter is used to configure one group of candidate resources. Each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

It should be understood that, in this embodiment of this application, the single piece of DCI indicates that the network device sends only one piece of DCI to the terminal device within a period of time. In a case of the single piece of DCI, the terminal device needs to blindly detect only one piece of DCI. In this embodiment of this application, the plurality of pieces of DC indicate that the network device sends at least two pieces of DCI to the terminal device in a period of time, for example, in at least one slot (slot). The at least two pieces of DCI may be sent by a same network device or may be simultaneously sent by at least two network devices. This embodiment of this application is not limited thereto.

Usually, when there are a plurality of pieces of DCI, the network device may set PDCCH configure IDs to distinguish between the plurality of pieces of DCI. Specifically, different pieces of DCI correspond to different values of the PDCCH configure IDs. For example, when there are N PDCCH configure parameters, a value of the PDCCH configure ID may be set to 1 to N or the like in this embodiment of this application. Herein, N is a positive integer greater than or equal to 1. For another example, in this embodiment of this application, the network device may set different PDCCH configure parameters by using a form of a table. For example, different PDCCH configure parameters correspond to different PDCCH configure ID indexes. In the embodiments, this embodiment of this application is not limited thereto.

It should be noted that, in an example instead of a limitation, because complexity of the blind detection performed by the terminal device cannot be too high, a quantity of pieces of DCI specific to the terminal device may be set to two at most. Therefore, there are only two PDCCH-Config parameters at most. In this case, the PDCCH configure ID may not be set in this embodiment of this application. In this embodiment of this application, two PDCCH-Config parameters may be directly set, for example, PDCCH configure 1 and PDCCH configure 2 (or referred to as first PDCCH configure and second PDCCH configure). Therefore, the configuration parameter (for example, BWP-DownlinkDedicated) may be used to set up or release PDCCH configure 1, or the configuration parameter may be used to set up or release PDCCH configure 2. Because there are only two PDCCH configure parameters, the two PDCCH configure parameters can be distinguished from each other without IDs to be set for the two parameters additionally.

For example, when the terminal device is in a single-station transmission scenario, the configuration parameter may be used to set up PDCCH configure 1. When the single-station transmission scenario is switched to a joint transmission scenario, the configuration parameter may be further used to set up PDCCH configure 2. In this case, after completing setting up the downlink control channel configuration, the terminal device obtains PDCCH configure 1 and PDCCH configure 2 in total. When the terminal device is switched from the joint transmission scenario to the single-station transmission scenario, the configuration parameter may be used to release PDCCH configure 1 or PDCCH configure 2. In this case, after completing releasing the downlink control channel configuration, the terminal device obtains PDCCH configure that is not released in PDCCH configure 1 and PDCCH configure 2.

Therefore, in this embodiment of this application, the PDCCH configure ID does not need to be additionally set, thereby reducing signaling overheads.

It should be understood that, in this embodiment of this application, the single-station transmission scenario indicates a scenario in which only one network device serves the terminal device, that is, only one network device performs data transmission with the terminal device; and the joint transmission scenario indicates a scenario in which at least two network devices serve the terminal device, that is, the at least two network devices transmit downlink data to the terminal device in a coordinated multipoint transmission manner.

With reference to the first aspect or the second aspect, in an implementation, the configuration parameter is used to configure (or referred to as set up (setup)) one or more groups of control resource sets;

or the configuration parameter is used to release one or more groups of control resource sets.

Each group of control resource sets is used to configure one group of candidate resources.

It should be understood that, in this embodiment of this application, after the terminal device configures the control resource set, the terminal device obtains at least one group of control resource sets in total; or after the terminal device releases the control resource set, the terminal device obtains at least one group of control resource sets in total.

For example, the configuration parameter may be PDCCH-Config. For example, the network side device configures PDCCH-Config by using BWP-DownlinkDedicated, and PDCCH-Config may be configured with a plurality of groups of control resource sets (a group of control resource sets may also be referred to as a control resource set group (CORESET group)). The group of control resource sets may include one or more control resource sets or index numbers of control resource sets. Alternatively, a CORESET group ID to which each CORESET belongs is specified for the CORESET. Each group of control resource sets is used to configure one group of candidate resources. The DCI sent by the network device is carried on the group of candidate resources configured by using the group of control resource sets.

It should be understood that, in this embodiment of this application, different groups of control resource sets may correspond to different network devices, or different groups of control resource sets may correspond to a same network device. This embodiment of this application is not limited thereto.

When different groups of control resource sets correspond to different network devices, different pieces of DCI come from different network devices.

When two or more different groups of control resource sets correspond to a same network device, two or more pieces of DCI corresponding to the two or more groups of control resource sets come from the same network device.

Usually, in an existing solution, for both a single piece of DCI and a plurality of pieces of DCI, one PDCCH-Config parameter is used to configure one group of candidate resources. Because the terminal device does not know a quantity of pieces of DCI, accuracy of blind detection of DCI can be ensured only after blind detection is performed on all candidate resources. In this embodiment of this application, one PDCCH-Config parameter may be used to configure one or more groups of candidate resources, and each group of candidate resources corresponds to one CORESET group. Each group of candidate resources carries only one piece of DCI. Therefore, once the terminal device blindly detects DCI on each group of candidate resources, the terminal device may stop the blind detection on the group of candidate resources, thereby avoiding blind detection on remaining resources, reducing complexity of the blind detection, and improving network performance.

Usually, when there are a plurality of pieces of DCI, the network device may set CORESET group IDs to distinguish between the plurality of pieces of DCI. The CORESET group ID may be carried in an information element (information element, IE) of the CORESET. Specifically, different pieces of DCI correspond to different values of the CORESET group IDs. For example, when there are N CORESET groups, a value of the CORESET group ID may be set to 1 to N or the like in this embodiment of this application. Herein, N is a positive integer greater than or equal to 1. For another example, in this embodiment of this application, the network device may set different values of the CORESET group IDs by using a form of a table. For example, different CORESET groups correspond to different CORESET group ID indexes. In the embodiments, this embodiment of this application is not limited thereto.

It should be noted that, in an example instead of a limitation, because complexity of the blind detection performed by the terminal device cannot be too high, a quantity of pieces of DCI specific to the terminal device may be set to two at most. Therefore, there are only two groups of control resource sets in PDCCH-Config at most. In this embodiment of this application, two CORESET groups may be directly set, for example, a CORESET group 1 and a CORESET group 2. Therefore, the configuration parameter (for example, PDCCH-Config) may be used to set up or release the CORESET group 1, or the configuration parameter may be used to set up or release the CORESET group 2. Because there are only two groups of control resource sets, the two groups of control resource sets can be distinguished from each other without IDs to be set for the two groups additionally.

For example, when the terminal device is in a single-station transmission scenario, the configuration parameter may be used to set up the CORESET group 1. When the single-station transmission scenario is switched to a joint transmission scenario, the configuration parameter may be used to set up the CORESET group 2. In this case, after completing setting up the control resource set, the terminal device obtains the CORESET group 1 and the CORESET group 2 in total. When the terminal device is switched from the joint transmission scenario to the single-station transmission, the configuration parameter may be used to release the CORESET group 1 or the CORESET group 2. In this way, after releasing the control resource set, the terminal device obtains a CORESET group that is not released in the CORESET group 1 and the CORESET group 2.

Therefore, in this embodiment of this application, the CORESET group ID does not need to be additionally set, thereby reducing signaling overheads.

With reference to the first aspect or the second aspect, in an implementation, the configuration parameter is used to set up one or more groups of search spaces;

or the configuration parameter is used to release one or more groups of search spaces.

Each group of search spaces is used to configure one group of candidate resources.

It should be understood that, in this embodiment of this application, after the terminal device completes setting up the search space, the terminal device obtains at least one group of search spaces in total; or after the terminal device completes releasing the search space, the terminal device obtains at least one group of search spaces in total.

For example, the configuration parameter may be PDCCH-Config. For example, the network side device configures PDCCH-Config by using BWP-DownlinkDedicated, and PDCCH-Config may be used to configure a plurality of groups of search spaces (a group of search spaces may also be referred to as a search space group (search space group)). The group of search spaces may include one or more search spaces or index numbers of search spaces. Each group of search spaces is used to configure one group of candidate resources, and each group of search spaces may correspond to one network device. The DCI sent by the network device is carried on the group of candidate resources configured by using the group of search spaces.

It should be understood that, in this embodiment of this application, different groups of search spaces may correspond to different network devices, or different groups of search spaces may correspond to a same network device. This embodiment of this application is not limited thereto.

When different groups of search spaces correspond to different network devices, different pieces of DCI come from different network devices.

When two or more different groups of search spaces correspond to a same network device, two or more pieces of DCI corresponding to the two or more groups of search spaces come from the same network device.

Usually, in an existing solution, for both a single piece of DCI and a plurality of pieces of DCI, one PDCCH-Config parameter is used to configure one group of candidate resources. Because the terminal device does not know a quantity of pieces of DCI, accuracy of blind detection of DC can be ensured only after blind detection is performed on all candidate resources. In this embodiment of this application, one PDCCH-Config parameter may be used to configure one or more groups of candidate resources. Each group of candidate resources carries only one piece of DCI. Therefore, once the terminal device blindly detects DCI on each group of candidate resources, the terminal device may stop the blind detection on the group of candidate resources, thereby avoiding blind detection on remaining resources, reducing complexity of the blind detection, and improving network performance.

Usually, when there are a plurality of pieces of DCI, the network device may set Search space group IDs to distinguish between the plurality of pieces of DCI. Specifically, different pieces of DCI correspond to different values of the Search space group IDs. For example, when there are N Search space groups, a value of the Search space group ID may be set to 1 to N or the like in this embodiment of this application. Herein, N is a positive integer greater than or equal to 1. For another example, in this embodiment of this application, the network device may set different values of the Search space group IDs by using a form of a table. For example, different Search space groups correspond to different Search space group ID indexes. In the embodiments, this embodiment of this application is not limited thereto.

It should be noted that, in an example instead of a limitation, because complexity of the blind detection performed by the terminal device cannot be too high, a quantity of pieces of DCI specific to the terminal device may be set to two at most. Therefore, there are only two groups of search spaces in PDCCH-Config at most. In this case, the Search space group ID may not be set in this embodiment of this application. In this embodiment of this application, two Search space groups may be directly set, for example, a Search space group 1 and a Search space group 2. Therefore, the configuration parameter (for example, PDCCH-Config) may be used to set up or release the Search space group 1, or the configuration parameter may be used to set up or release the Search space group 2. Because there are only two groups of search spaces, the two groups of search spaces can be distinguished from each other without IDs to be set for the two groups additionally.

For example, when the terminal device is in a single-station transmission scenario, the configuration parameter may be used to set up the Search space group 1. When the single-station transmission scenario is switched to a joint transmission scenario, the configuration parameter may be used to set up the Search space group 2. In this case, after completing setting up the search space, the terminal device obtains the Search space group 1 and the Search space group 2 in total. When the terminal device is switched from the joint transmission scenario to the single-station transmission, the configuration parameter may be used to release the Search space group 1 or the Search space group 2. In this way, after releasing the search space, the terminal device obtains a Search space group that is not released in the Search space group 1 and the Search space group 2.

Therefore, in this embodiment of this application, the Search space group ID does not need to be additionally set, thereby reducing signaling overheads.

With reference to the first aspect or the second aspect, in an implementation, in this embodiment of this application, a quantity of BWP-DownlinkDedicated parameters may be set to correspond to a quantity of pieces of DCI. For example, in an optional embodiment, the configuration parameter includes at least one BWP-DownlinkDedicated parameter. Each BWP-DownlinkDedicated is used to configure one group of candidate resources. Each group of candidate resources carries one piece of DCI. Each BWP-DownlinkDedicated may correspond to one network device. The DCI sent by the network device is carried on the group of candidate resources configured by using BWP-DownlinkDedicated.

Usually, in an existing solution, for both a single piece of DCI and a plurality of pieces of DCI, the network device sends only one BWP-DownlinkDedicated parameter, and the BWP-DownlinkDedicated parameter is used to configure one group of candidate resources. Because the terminal device does not know a quantity of pieces of DCI, accuracy of blind detection of DCI can be ensured only after blind detection is performed on all candidate resources. In this embodiment of this application, the configuration parameter may include one or more BWP-DownlinkDedicated parameters. One BWP-DownlinkDedicated parameter is used to configure one group of candidate resources. Each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

Specifically, in this embodiment of this application, how many network devices send DCI indicates how many BWP-DownlinkDedicated parameters are received by the terminal device. Once the terminal device blindly detects DCI on a group of candidate resources configured by using each BWP-DownlinkDedicated, the terminal device may stop blind detection on the group of candidate resources, thereby avoiding blind detection on remaining resources, reducing complexity of the blind detection, and improving network performance.

It should be understood that, in actual application, when the network side device needs to send a plurality of BWP-DownlinkDedicated parameters, the plurality of BWP-DownlinkDedicated parameters may be sent by one network device, or may be separately sent by a plurality of network devices. This embodiment of this application is not limited thereto.

The foregoing describes a case in which there are several pieces of DCI, the network side device configures several groups of candidate resources, and each group of candidate resources carries one piece of DCI.

Alternatively, in an implementation, the network side device may configure several groups of candidate resources, and each group of candidate resources may carry one piece of DCI. In this embodiment of this application, an active state or an inactive state may be set in each group of candidate resources. The active state is used to indicate that one piece of DCI is carried on the group of candidate resources, and the inactive state is used to indicate that no DC is carried on the group of candidate resources. For example, in this embodiment of this application, one piece of indication information may be set in a configuration parameter of each group of candidate resources. The indication information is used to indicate whether a state of the group of candidate resources is the active state or the inactive state. For example, the indication information is 1 bit. When a value of the indication information is 1, it indicates the active state; or when a value of the indication information is 0, it indicates the inactive state. Specifically, the indication information may be carried in BWP-DownlinkDedicated, PDCCH-Config, the CORESET group, or the search space (search space, SS) group. This embodiment of this application is not limited thereto. When the group of candidate resources is in the active state, the terminal device stops the blind detection on the group of candidate resources after the terminal device blindly detects the DC on the group of candidate resources, and does not need to continue the blind detection on remaining resources on the group of candidate resources. When the group of candidate resources is in the inactive state, the terminal device does not need to perform the blind detection on the candidate resources. In this embodiment of this application, blind detection efficiency can be improved.

Alternatively, in an implementation, regardless of a quantity of pieces of DCI, the network side device may configure only one group of candidate resources by using the configuration parameter.

For example, the network side device generates the configuration parameter, and sends the configuration parameter to the terminal device. The configuration parameter is used to configure the group of candidate resources, and the configuration parameter includes first indication information used to indicate the quantity of pieces of DCI. The terminal device blindly detects the DCI on the group of candidate resources based on the first indication information.

The configuration parameter may be BWP-DownlinkDedicated, or may be PDCCH-Config. This embodiment of this application is not limited thereto.

It should be understood that the first indication information may be carried in BWP-DownlinkDedicated, PDCCH-Config, the CORESET, or the search space (search space, SS). This embodiment of this application is not limited thereto.

Specifically, in this embodiment of this application, information exchange may be performed between a plurality of network devices by using a non-ideal backhaul (non-ideal backhaul, NIB), to effectively distinguish time domain/frequency domain/space domain and determine a value status of the first indication information in the configuration parameter. For example, the first indication information may be a parameter x. When the value status of the parameter is enable (enable), it may indicate that there are a plurality of pieces of DCI on the group of candidate resources. When the value status of the parameter is disable (disable), it may indicate that there is one piece of DCI on the group of candidate resources. In this case, the parameter x may be 1 bit. For example, 1 indicates that the value status is enable, and 0 indicates that the value status is disable.

The terminal device detects a corresponding quantity of pieces of DCI on the group of candidate resources based on a value of the first indication information. For example, the first indication information indicates that there are a plurality of pieces of DCI. Because the terminal device only knows that there are a plurality of pieces of DCI but does not know a specific quantity of pieces of DCI, in this case, the terminal device needs to perform detection on all resources. When the first indication information indicates that there is one piece of DCI, the terminal device may stop the detection when the terminal device detects one piece of DCI, thereby avoiding blind detection on remaining resources, reducing complexity of the blind detection, and improving network performance.

It should be noted that, in an example instead of a limitation, because complexity of the blind detection performed by the terminal device cannot be too high, a quantity of pieces of DCI specific to the terminal device may be set to two at most. In this case, the first indication information has only two values. Therefore, in this embodiment of this application, when the value status of the parameter is enable (enable), it may indicate that there are two pieces of DCI on the group of candidate resources; or when the value status of the parameter is disable (disable), it may indicate that there is one piece of DCI on the group of candidate resources. In this case, the parameter x may be 1 bit. For example, 1 indicates that the value status is enable, and 0 indicates that the value status is disable. The terminal device detects a corresponding quantity of pieces of DCI on the group of candidate resources based on the value of the first indication information. For example, when the first indication information indicates that there are two pieces of DCI, the terminal device may stop the blind detection after the terminal device detects the two pieces of DCI. When the first indication information indicates that there is one piece of DCI, the terminal device may stop the detection when the terminal device detects one piece of DCI, thereby avoiding blind detection on remaining resources, reducing complexity of the blind detection, and improving network performance.

Alternatively, for another example, a value of the first indication information may indicate a quantity (for example, may be a maximum quantity or an actual quantity) of pieces of DCI. For example, the first indication information may be a parameter x, and a value of x is equal to the maximum quantity of pieces of DCI. For example, when the value of x is 2, it indicates that there are two pieces of DCI on the group of resources at most. Alternatively, the value of x is equal to the actual quantity of pieces of DCI. When the value of x is 2, it indicates that there are two pieces of DCI on the group of resources.

The terminal device detects a corresponding quantity of pieces of DCI on the group of candidate resources based on the value of the first indication information. For example, when the first indication information indicates that there are three pieces of DCI at most (or in practice), the terminal device may stop the blind detection after the terminal device detects the three pieces of DCI, thereby avoiding blind detection on remaining resources, reducing complexity of the blind detection, and improving network performance.

It should be noted that the foregoing embodiment describes a case in which the first indication information may be located in the configuration parameter. Optionally, the first indication information may also be independent, for example, sent by using separate signaling. In other words, the first indication information and the configuration parameter used to configure a candidate resource are two independent parameters. This embodiment of this application is not limited thereto.

According to a third aspect, a communications apparatus is provided, including modules or units that are configured to perform the method in the first aspect or any one of the possible implementations of the first aspect.

In an implementation, the communications apparatus is a terminal device.

According to a fourth aspect, a communications apparatus is provided, including modules or units that are configured to perform the method in the second aspect or any one of the possible implementations of the second aspect.

In an implementation, the communications apparatus is a network side device.

According to a fifth aspect, a communications apparatus is provided, including a transceiver, a processor, and a memory. The processor is configured to control the transceiver to receive and send a signal, the memory is configured to store a computer program, and the processor is configured to invoke the computer program from the memory for running, so that a network device performs the method in the first aspect or the possible implementations of the first aspect.

In an implementation, the communications apparatus is a terminal device.

According to a sixth aspect, a communications apparatus is provided, including a transceiver, a processor, and a memory. The processor is configured to control the transceiver to receive and send a signal, the memory is configured to store a computer program, and the processor is configured to invoke the computer program from the memory for running, so that a terminal device performs the method in the second aspect or the possible implementations of the second aspect.

In an implementation, the communications apparatus is a network side device.

According to a seventh aspect, a computer readable medium is provided, and a computer program is stored in the computer readable medium. The computer program is executed by a computer to implement the method in the first aspect or any one of the possible implementations of the first aspect.

According to an eighth aspect, a computer readable medium is provided, and a computer program is stored in the computer readable medium. The computer program is executed by a computer to implement the method in the second aspect or any one of the possible implementations of the second aspect.

According to a ninth aspect, a computer program product is provided, and the computer program product is executed by a computer to implement the method in the first aspect or any one of the possible implementations of the first aspect.

According to a tenth aspect, a computer program product is provided, and the computer program product is executed by a computer to implement the method in the second aspect or any one of the possible implementations of the second aspect.

According to an eleventh aspect, a processing apparatus is provided, including a processor and an interface.

The processor is configured to be used as an execution body to perform the methods in the first aspect, the second aspect, any one of the possible implementations of the first aspect, or any one of the possible implementations of the second aspect. A related data exchange process (for example, a data transmission/reception process) is completed by using the interface. In a specific implementation process, the interface may further complete the foregoing data exchange process by using a transceiver.

It should be understood that the processing apparatus in the foregoing eleventh aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, and may be located outside the processor, or may exist independently.

According to a twelfth aspect, a system is provided, including the terminal device and the network side device described above.

EMBODIMENTS

The following describes technical solutions of this application with reference to accompanying drawings.

The embodiments of this application may be used in various communications systems. Therefore, the following descriptions are not limited to a particular communications system. For example, the embodiments of this application may be used in a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a future 5th generation (5th generation, 5G) system, or a new radio (new radio, NR) system.

Figure 1:
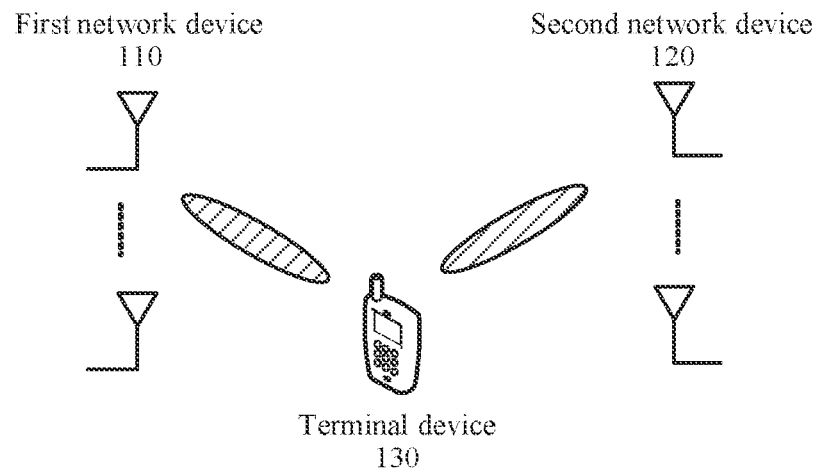
FIG. 1 is a schematic diagram of a scenario in which an embodiment of this application can be applied.

FIG. 1 is a schematic block diagram of a wireless communications system 100 to which an embodiment of this application can be applied. The wireless communications system 100 may include one or more network devices and one or more terminal devices. For example, as shown in FIG. 1, the wireless communications system 100 includes a first network device 110, a second network device 120, and one or more terminal devices 130 that are located within coverage of the first network device 110 and the second network device 120. The terminal device 130 may be mobile or static. Both the first network device 110 and the second network device 120 may communicate with the terminal device 130 through wireless air interfaces. The first network device 110 and the second network device 120 may provide communication coverage for a particular geographical area, and may communicate with a terminal device in the coverage area.

It should be understood that "first", "second", and the like in this embodiment of this application are merely used for distinguishing, and "first" and "second" do not constitute any limitation on this embodiment of this application.

The first network device 110 or the second network device 120 may be a base transceiver station (base transceiver station, BTS) in a global system for mobile communications (global system for mobile communications, GSM) or a code division multiple access (code division multiple access. CDMA) system, or may be a nodeB (NodeB, NB) in a wideband code division multiple access (wideband code division multiple access, WCDMA) system, or may be an evolved nodeB (evolved NodeB, eNB or eNodeB) in an LTE system, or may be a radio controller in a cloud radio access network (cloud radio access network, CRAN) scenario. Alternatively, the network device may be a relay station, an access point, an in-vehicle device, a wearable device, a network device in a future 5G network, or a network device in a future evolved PLMN network, for example, a transfer point (a TRP or a TP) in an NR system, a gNB (gNB) in an NR system, or an antenna panel or a group of antenna panels (including a plurality of antenna panels) of a base station in a 5G system. This is not specifically limited in this embodiment of this application.

The terminal device 130 may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (Session Initiation Protocol, SIP) phone, a wireless local loop (wireless local loop. WLL) station, a personal digital assistant (Personal Digital Assistant, PDA), a handheld device having a wireless communication function, a computing device or another processing device connected to a wireless modem, an in-vehicle device, a wearable device, a smart home device, a drone device, a terminal device in a future 5G network, a terminal device in a future evolved public land mobile network (public land mobile network, PLMN), or the like. This is not limited in this embodiment of this application.

The wireless communications system 100 may support CoMP transmission (or referred to as joint transmission), that is, at least two network devices (transfer points) transmit downlink data to a terminal device in a coordinated multipoint transmission manner. In other words, the terminal device 130 may communicate with both the first network device 110 and the second network device 120 on a same carrier. The coordinated multipoint transmission manner may be implemented by using technologies such as space diversity and/or spatial multiplexing. This is not limited in this application.

The "coordinated multipoint transmission" in this application includes but is not limited to joint transmission JT. The JT includes coherent JT and non-coherent JT (NCJT). A difference between the coherent JT and the non-coherent JT is that; for the NCJT, beamforming is separately performed for different MIMO data streams from a plurality of coordinated TPs; and for the coherent JT, beamforming is jointly performed for all MIMO data streams from a plurality of coordinated TPs.

In this embodiment of this application, the first network device may be a serving network device, and the second network device may be a coordinated network device; or the first network device may be a coordinated network device, and the second network device may be a serving network device.

In an application scenario of the coordinated multipoint transmission, the serving network device may send control signaling to the terminal device, and the coordinated network device may send data to the terminal device; or the serving network device may send control signaling to the terminal device, and the servicing network device and the coordinated network device may both send data to the terminal device; or the serving network device and the coordinated network device may both send control signaling to the terminal device, and the serving network device and the coordinated network device may both send data to the terminal device. This is not specifically limited in this embodiment of this application. Communication may be performed between the serving network device and the coordinated network device and between a plurality of coordinated network devices, for example, transmission of a control message.

In a coordinated multipoint transmission mode, at least two transfer points (transfer point, TRP) separately send control information to the terminal device by using a control channel. When the terminal device is moved, a transmission mode of the terminal device may be switched back and forth between a multipoint transmission mode and a single-station transmission mode. In the multipoint transmission mode, the terminal device may receive DCI separately sent by a plurality of transfer points, that is, the terminal device needs to blindly detect a plurality of pieces of DCI. In the single-station transmission mode, the terminal device communicates with only one network device. For example, for FIG. 1, the terminal device 130 communicates with only the first network device 110 or the second network device 120 in FIG. 1. In this case, the terminal device receives only DCI sent by a single transfer point, that is, the terminal device needs to blindly detect one piece of DCI.

After signaling is delivered in the conventional technology, if there are two pieces of DCI, the two pieces of DCI can only be in a search space configured by using a downlink control channel configuration parameter (physical downlink control channel config, PDCCH-Config). From a perspective of the network device, DC sent to a same terminal device needs to be placed in different search spaces through information transmission between network devices, for example, information exchange performed by using a non-ideal backhaul (non-ideal backhaul, NIB). However, from a perspective of the terminal device, because the terminal device does not know a quantity of pieces of DCI to be sent to the terminal device, the terminal device can correctly detect all the DCI only through performing blind detection on locations in all possible search spaces. Such an operation greatly increases complexity of the blind detection performed by the terminal device. The complexity of the blind detection requires a particularly high capability of the terminal device, which is a problem that the terminal device needs to specifically consider.

In view of the foregoing problem, an embodiment of this application provides a DCI method, to reduce complexity of blind detection.

For ease of understanding and description, in an example and not a limitation, the following describes an execution process and an execution action of the method in a communications system in this application.

It should be understood that, in this embodiment of this application, the terminal device or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems for implementing service processing by using a process (process), for example, a Linux operating system, a Unix operating system, an Android operating system, an iOS operating system, or a Windows operating system. The application layer includes applications such as a browser, an address book, word processing software, and instant messaging software. In addition, this embodiment of this application does not particularly limit a specific structure of an execution body of the method provided in this embodiment of this application, provided that a program recording code of the method provided in this embodiment of this application can be run to implement communication according to the method provided in this embodiment of this application. For example, the execution body of the method provided in this embodiment of this application may be the terminal device or the network device, or may be a function module that can invoke and execute a program in the terminal device or the network device.

In addition, aspects or features of this application may be implemented as a method, an apparatus, or a product that uses standard programming and/or engineering technologies. The term "product" used in this application covers a computer program that can be accessed from any computer readable component, carrier, or medium. For example, a computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine readable media that is used to store information. The term "machine readable media" may include but is not limited to a radio channel, and various other media that can store, contain, and/or carry an instruction and/or data.

It should be understood that the joint transmission scenario in which this embodiment of this application shown in FIG. 1 can be applied may be a joint transmission scenario of a homogeneous network, or may be a joint transmission scenario of a heterogeneous network. This is not limited in this embodiment of this application.

It should be further understood that the scenario shown in FIG. 1 may be a low-frequency scenario, or may be a high-frequency scenario. This is not limited in this embodiment of this application.

It should be noted that some names and English abbreviations in an LTE system are used in this specification as examples to describe the embodiments of this application, but the embodiments of this application are not limited thereto. The names and the English abbreviations may change as a network evolves. For specific evolution, refer to descriptions in a corresponding standard, for example, refer to corresponding descriptions in 5G.

Figure 2:
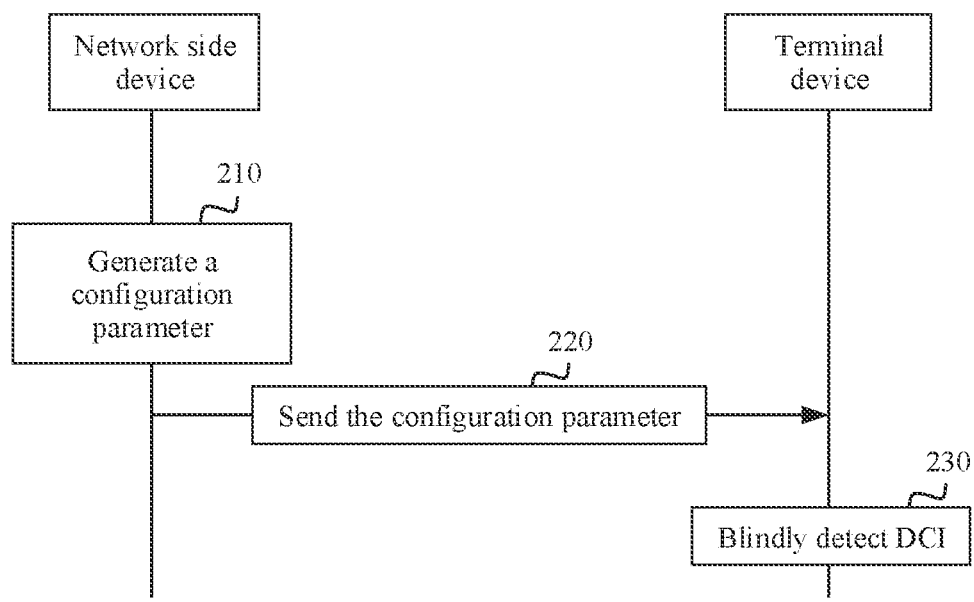
FIG. 2 is a schematic flowchart of a communication method according to this application.

FIG. 2 is a schematic flowchart of a method 200 according to an embodiment of this application. The method shown in FIG. 2 may be used in the communication system supporting CoMP shown in FIG. 1. It should be understood that, for ease of description, at least two network devices included in the communications system are collectively referred to as network side devices in the following. The method 200 shown in FIG. 2 includes the following steps.

210. A network side device generates a configuration parameter.

Specifically, the configuration parameter is used to configure at least one group of candidate resources, and each group of candidate resources carries one piece of DCI.

It should be understood that, in step 210, the network side device that generates the configuration parameter may be any network device that communicates with a terminal device. For example, the configuration parameter may be generated by a first network device or a second network device. Optionally, the network side device that generates the configuration parameter may be alternatively a first network device and a second network device. For example, the first network device and the second network device negotiate with each other to generate the configuration parameter. This embodiment of this application is not limited thereto.

In this embodiment of this application, the configuration parameter indicates parameter information that is used to obtain DCI and that is of a candidate resource. The network side device (for example, the first network device or the second network device) may send the configuration parameter to the terminal device by using signaling. It should be understood that, in this embodiment of this application, the configuration parameter may also be referred to as a configuration field, an information element (information element, IE), or the like. This embodiment of this application is not limited thereto.

It should be understood that, in this embodiment of this application, the candidate resource indicates a resource that can carry DCI. The terminal device needs to perform blind detection on the candidate resource to obtain the DCI.

Specifically, in the conventional technology, regardless of a quantity of pieces of DCI, the network side device configures only one group of candidate resources, and the terminal device needs to perform blind detection on all candidate resources to ensure correct detection of the DCI.

In this embodiment of this application, candidate resources are grouped by using the configuration parameter, and each group of candidate resources carries only one piece of DCI. Therefore, once the terminal device blindly detects DCI on each group of candidate resources, the terminal device may stop the blind detection on the group of candidate resources, thereby avoiding blind detection on remaining resources, reducing complexity of the blind detection, and improving network performance.

Usually, the DCI includes a cyclic redundancy check (cyclic redundancy check, CRC) field. The CRC field is scrambled based on a radio network temporary identifier (radio network temporary identity, RNTI) of the terminal device in the DCI. In this case, the terminal device may perform blind detection based on the CRC in the DCI to determine the DCI sent to the terminal device. Usually, the RNTI may be specifically divided into a plurality of types. The plurality of types may be, for example but not limited to, a temporary configure RNTI (temporary configure RNTI, TC-RNTI) and a cell RNTI (cell RNTI, C-RNTI). Related content about the DCI and the CRC of the DCI has been clearly described in the conventional technology. Details are not described herein.

It should be understood that, in this embodiment of this application, when there are a plurality of pieces of DCI, for example, N pieces of DCI, the N pieces of DCI may come from N network devices, where N is an integer greater than or equal to 1. Optionally, the N pieces of DCI may alternatively come from M network devices, where M is less than N. This embodiment of this application is not limited thereto.

In this embodiment of this application, the configuration parameter may have a plurality of forms. The configuration parameter may be a bandwidth part-downlink dedicated (BWP-DownlinkDedicated) parameter or a downlink control channel configuration (physical downlink control channel config, PDCCH-Config) parameter.

Specifically, in this embodiment of this application, BWP-DownlinkDedicated is used to set up or release PDCCH-Config, and a parameter included in PDCCH-Config is used to detect a candidate downlink control channel (physical downlink control channel, PDCCH). PDCCH-Config may include a control resource set (control resource sets, CORESET) configuration parameter and a search space (search space) configuration parameter. The CORESET may be referred to as a control resource set, that is, a time-frequency resource of the CORESET, for example, a size of a resource block occupied by DCI in frequency domain or a quantity of symbols occupied in time domain; or may be referred to as a control resource set configuration parameter, that is, a parameter that is related to a signaling configuration and that is used to obtain a time-frequency resource of the CORESET. The search space may be referred to as a search space configuration parameter, that is, a parameter related to a signaling configuration. The parameter is used to obtain a time and a manner of searching for a candidate or a possible PDCCH. For example, the search space may indicate a possible location of a start symbol of DCI, or the search space may directly indicate a place for detecting a candidate PDCCH or a place on which detection needs to be performed.

The following describes examples of cases of the configuration parameter in this embodiment of this application.

Case 1:

The configuration parameter is used to set up one or more downlink control channel configurations. After completing setting up the downlink control channel configuration, the terminal device obtains at least one downlink control channel configuration in total.

Alternatively,

The configuration parameter is used to release one or more downlink control channel configurations. After completing releasing the downlink control channel configuration, the terminal device obtains at least one downlink control channel configuration in total.

Each downlink control channel configuration is used to configure one group of candidate resources.

For example, the configuration parameter may be BWP-DownlinkDedicated, and the downlink control channel configuration may be PDCCH-Config. BWP-DownlinkDedicated is used to set up or release the downlink control channel configuration PDCCH-Config. Each PDCCH-Config is used to configure one group of candidate resources, and each PDCCH-Config may correspond to one network device. DCI sent by the network device is carried on the group of candidate resources configured by using PDCCH-Config.

It should be understood that, in this embodiment of this application, different PDCCH-Config parameters may correspond to different network devices, or different PDCCH-Config parameters may correspond to a same network device. This embodiment of this application is not limited thereto.

When different PDCCH-Config parameters correspond to different network devices, different pieces of DCI come from different network devices.

When two or more different PDCCH-Config parameters correspond to a same network device, two or more pieces of DCI corresponding to the two or more PDCCH-Config parameters come from the same network device.

Usually, in an existing solution, for both a single piece of DCI and a plurality of pieces of DCI, BWP-DownlinkDedicated includes only one PDCCH-Config parameter, and the PDCCH-Config parameter is used to configure one group of candidate resources. Because the terminal device does not know a quantity of pieces of DCI carried on the group of candidate resources, accuracy of blind detection of DCI can be ensured only after blind detection is performed on all candidate resources in the group of candidate resources. In this embodiment of this application, the configuration parameter may be configured with at least one PDCCH-Config parameter. One PDCCH-Config parameter is used to configure one group of candidate resources. Each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

It should be understood that, in this embodiment of this application, the single piece of DCI indicates that the network device sends only one piece of DCI to the terminal device within a period of time. In a case of the single piece of DCI, the terminal device needs to blindly detect only one piece of DCI. In this embodiment of this application, the plurality of pieces of DCI indicate that the network device sends at least two pieces of DCI to the terminal device in a period of time, for example, in at least one slot (slot). The at least two pieces of DCI may be sent by a same network device or may be simultaneously sent by at least two network devices. This embodiment of this application is not limited thereto.

Usually, when there are a plurality of pieces of DCI, the network device may set PDCCH configure IDs to distinguish between the plurality of pieces of DCI. Specifically, different pieces of DCI correspond to different values of PDCCH configure IDs. For example, when there are N PDCCH configure parameters, a value of the PDCCH configure ID may be set to 1 to N or the like in this embodiment of this application. Herein, N is a positive integer greater than or equal to 1. For another example, in this embodiment of this application, the network device may set different PDCCH configure parameters by using a form of a table. For example, different PDCCH configure parameters correspond to different PDCCH configure ID indexes. In the embodiments, this embodiment of this application is not limited thereto.

Specifically, in this embodiment of this application, information exchange may be performed between a plurality of network devices by using a non-ideal backhaul (non-ideal backhaul, NIB). It is determined that one or more pieces of PDCCH-Config information are delivered in BWP-DownlinkDedicated. Different network devices use different PDCCH-Config parameters. Different PDCCH-Config parameters may correspond to different PDCCH config IDs. Different PDCCH-Config parameters can be used to effectively distinguish time domain/frequency domain/space domain, that is, different PDCCH-Config parameters correspond to different candidate resources.

For example, when the terminal device is in a single-station transmission mode, the network side device (for example, the network side device indicates a network device communicating with the terminal device) generates and sends the configuration parameter. For example, the configuration parameter may be used to set up PDCCH-Config, for example, PDCCH-Config 1. In other words, in PDCCH-Config, a PDCCH-Config ID=1. Because the terminal device obtains only one PDCCH-Config parameter, the terminal device blindly detects DCI on only one group of candidate resources configured by using the PDCCH-Config parameter. Once the terminal device detects the DCI, the terminal device may stop the blind detection.

When the terminal device is switched from the single-station transmission mode to a two-station joint transmission mode, the network side device generates a new configuration parameter and sends the new configuration parameter. For example, the configuration parameter may be used to set up PDCCH-Config, for example, PDCCH-Config 2. In other words, in PDCCH-Config, a PDCCH-Config ID=2. In this case, after completing setting up the downlink control channel configuration, the terminal device obtains two downlink control channel configurations in total. Then, the terminal device may separately blindly detect DCI on two groups of candidate resources configured by using the two PDCCH-Config parameters. Once the terminal device detects the DCI on each group of candidate resources, the terminal device may stop the blind detection.

It should be understood that the network device in the two-station joint transmission mode that generates the new configuration parameter and the network device in the single-station transmission mode that generates the configuration parameter may be a same device or may be different devices. This embodiment of this application is not limited thereto. In addition, in this embodiment of this application, the network device that generates the configuration parameter and the network device that sends the configuration parameter may be a same network device or may be different network devices. This embodiment of this application is not limited thereto.

Then, when the terminal device is switched from the two-station transmission mode to a multi-station joint transmission mode, the network side device generates a new configuration parameter and sends the new configuration parameter. For example, the new configuration parameter may be used to set up PDCCH-Config, for example, PDCCH-Config 3. In other words, a PDCCH-Config ID=3. In this case, after completing setting up the downlink control channel configuration, the terminal device obtains three downlink control channel configurations in total. Then, the terminal device may separately blindly detect DCI on two groups of candidate resources configured by using the three PDCCH-Config parameters. Once the terminal device detects DCI on each group of candidate resources, the terminal device may stop the blind detection. Alternatively, the new configuration parameter may be used to set up a plurality of PDCCH-Config parameters, for example, PDCCH-Config 3, . . . , and PDCCH-Config N. In this way, after completing setting up the downlink control channel configuration, the terminal device obtains N downlink control channel configurations in total. Then, the terminal device may separately blindly detect DCI on two groups of candidate resources configured by using the N PDCCH-Config parameters. Once the terminal device detects the DCI on each group of candidate resources, the terminal device may stop the blind detection.

Alternatively, when the terminal device is switched from the two-station transmission mode to a single-station joint transmission mode, the network side device generates a new configuration parameter and sends the new configuration parameter. For example, the new configuration parameter may be used to release PDCCH-Config, for example, PDCCH-Config 1. In this case, after completing releasing the downlink control channel configuration, the terminal device obtains one downlink control channel configuration in total, that is, PDCCH-Config 2. Because the terminal device obtains only one PDCCH-Config parameter, the terminal device blindly detects DCI on one group of candidate resources configured by using the PDCCH-Config parameter. Once the terminal device detects DCI, the terminal device may stop the blind detection.

Similarly, the terminal device may set up or release one or more downlink control channel configurations by using a new configuration parameter. A person skilled in the art may perform corresponding modification according to the foregoing examples. The examples are not listed one by one herein.

It should be noted that, in an example instead of a limitation, because complexity of the blind detection performed by the terminal device cannot be too high, a quantity of pieces of DCI specific to the terminal device may be set to two at most. Therefore, there are only two PDCCH-Config parameters at most. In this case, the PDCCH configure ID may not be set in this embodiment of this application. In this embodiment of this application, two PDCCH-Config parameters may be directly set, for example, PDCCH configure 1 and PDCCH configure 2. Therefore, the configuration parameter (for example, BWP-DownlinkDedicated) may be used to set up or release PDCCH configure 1, or the configuration parameter may be used to set up or release PDCCH configure 2. Because there are only two PDCCH configure parameters, the two PDCCH configure parameters can be distinguished from each other without IDs to be set for the two parameters additionally.

For example, when the terminal device is in the single-station transmission scenario, the configuration parameter may be used to set up PDCCH configure 1. When the single-station transmission scenario is switched to a joint transmission scenario, the configuration parameter may be used to set up PDCCH configure 2. In this case, after completing setting up the downlink control channel configuration, the terminal device obtains PDCCH configure 1 and PDCCH configure 2 in total. When the terminal device is switched from the joint transmission scenario to the single-station transmission, the configuration parameter may be used to release PDCCH configure 1 or PDCCH configure 2. In this case, after releasing the downlink control channel configuration, the terminal device obtains PDCCH configure that is not released in PDCCH configure 1 and PDCCH configure 2.

Therefore, in this embodiment of this application, the PDCCH configure ID does not need to be additionally set, thereby reducing signaling overheads.

It should be understood that, in this embodiment of this application, the single-station transmission scenario indicates a scenario in which only one network device serves the terminal device, that is, only one network device performs data transmission with the terminal device; and the joint transmission scenario indicates a scenario in which at least two network devices serve the terminal device, that is, the at least two network devices transmit downlink data to the terminal device in a coordinated multipoint transmission manner.

Case 2:

The configuration parameter is used to configure one or more groups of control resource sets. After completing setting up the control resource set, the terminal device obtains at least one group of control resource sets in total.

Alternatively,

The configuration parameter is used to release one or more groups of control resource sets. After completing releasing the control resource set, the terminal device obtains at least one group of control resource sets in total.

Each group of control resource sets is used to configure one group of candidate resources.

For example, the configuration parameter may be PDCCH-Config. For example, the network side device configures PDCCH-Config by using BWP-DownlinkDedicated, and PDCCH-Config may be configured with a plurality of groups of control resource sets (a group of control resource sets may also be referred to as a control resource set group (CORESET group)). The group of control resource sets may include one or more control resource sets or index numbers of control resource sets. Alternatively, a CORESET group ID to which each CORESET belongs is specified for the CORESET. Each group of control resource sets is used to configure one group of candidate resources, and each group of control resource sets may correspond to one network device. The DCI sent by the network device is carried on the group of candidate resources configured by using the group of control resource sets.

It should be understood that, in this embodiment of this application, different groups of control resource sets may correspond to different network devices, or different groups of control resource sets may correspond to a same network device. This embodiment of this application is not limited thereto.

When different groups of control resource sets correspond to different network devices, different pieces of DCI come from different network devices.

When two or more different groups of control resource sets correspond to a same network device, two or more pieces of DCI corresponding to the two or more groups of control resource sets come from the same network device.

Usually, in an existing solution, for both a single piece of DCI and a plurality of pieces of DCI, one PDCCH-Config parameter is used to configure one group of candidate resources. Because the terminal device does not know a quantity of pieces of DCI, accuracy of blind detection of DCI can be ensured only after blind detection is performed on all candidate resources. In this embodiment of this application, one PDCCH-Config parameter may be used to configure one or more groups of candidate resources, and each group of candidate resources corresponds to one CORESET group. Each group of candidate resources carries only one piece of DCI. Therefore, once the terminal device blindly detects DCI on each group of candidate resources, the terminal device may stop the blind detection on the group of candidate resources, thereby avoiding blind detection on remaining resources, reducing complexity of the blind detection, and improving network performance.

Usually, when there are a plurality of pieces of DCI, the network device may set CORESET group IDs to distinguish between the plurality of pieces of DCI. The CORESET group ID may be carried in an IE of the CORESET. Specifically, different pieces of DC correspond to different values of the CORESET group IDs. For example, when there are N CORESET groups, a value of the CORESET group ID may be set to 1 to N or the like in this embodiment of this application. Herein, N is a positive integer greater than or equal to 1. For another example, in this embodiment of this application, the network device may set different values of the CORESET group IDs by using a form of a table. For example, different CORESET groups correspond to different CORESET group ID indexes. In the embodiments, this embodiment of this application is not limited thereto.

Specifically, in this embodiment of this application, information exchange may be performed between a plurality of network devices by using a non-ideal backhaul (non-ideal backhaul, NIB). One or more groups of control resource sets may be delivered by using PDCCH-Config. Different network devices use different groups of control resource sets (CORESET group). Different CORESET groups may correspond to different CORESET group IDs. Different CORESET groups correspond to different candidate resource sets.

For example, when the terminal device is in a single-station transmission mode, the network side device generates and sends the configuration parameter. For example, the configuration parameter may be used to set up a CORESET group, for example, a CORESET group 1. In other words, a CORESET group ID=1. Because the terminal device obtains only one CORESET group, the terminal device blindly detects DCI on only one group of candidate resources configured by using the CORESET group. Once the terminal device detects DCI, the terminal device may stop the blind detection.

When the terminal device is switched from the single-station transmission mode to a two-station joint transmission mode, the network side device generates a new configuration parameter and sends the new configuration parameter. For example, the configuration parameter may be used to set up a CORESET group, for example, a CORESET group 2. In other words, a CORESET group ID=2. In this way, after completing setting up the control resource set, the terminal device obtains two groups of control resource sets in total, that is, the CORESET group 1 and the CORESET group 2. Then, the terminal device may separately blindly detect DCI on two groups of candidate resources configured by using the two CORESET groups. Once the terminal device detects the DCI on each group of candidate resources, the terminal device may stop the blind detection.

It should be understood that the network device in the two-station joint transmission mode that generates the new configuration parameter and the network device in the single-station transmission mode that generates the configuration parameter may be a same device or may be different devices. This embodiment of this application is not limited thereto. In addition, in this embodiment of this application, the network device that generates the configuration parameter and the network device that sends the configuration parameter may be a same network device or may be different network devices. This embodiment of this application is not limited thereto.

Then, when the terminal device is switched from the two-station transmission mode to a multi-station joint transmission mode, the network side device generates a new configuration parameter and sends the new configuration parameter. For example, the new configuration parameter may be used to set up a group of control resource sets, for example, a CORESET group 3. In other words, a CORESET group ID=3. In this case, after completing setting up the control resource set, the terminal device obtains three groups of control resource sets in total. Then, the terminal device may separately blindly detect DCI on three groups of candidate resources configured by using the three groups of control resource sets. Once the terminal device detects the DCI on each group of candidate resources, the terminal device may stop the blind detection. Alternatively, the new configuration parameter may be used to set up a plurality of groups of control resource sets, for example, a CORESET group 3, . . . , and a CORESET group N. In this way, after completing setting up the control resource set, the terminal device obtains N groups of control resource sets in total. Then, the terminal device may separately blindly detect DCI on N groups of candidate resources configured by using the N groups of control resource sets. Once the terminal device detects the DCI on each group of candidate resources, the terminal device may stop the blind detection.

Alternatively, when the terminal device is switched from the two-station transmission mode to a single-station joint transmission mode, the network side device generates a new configuration parameter and sends the new configuration parameter. For example, the new configuration parameter may be used to release a group of control resource sets, for example, a CORESET group 1. In this case, after completing releasing the group of control resource sets, the terminal device obtains one group of control resource sets in total, that is, a CORESET group 2. Because the terminal device obtains only one group of control resource sets, the terminal device blindly detects DCI on one group of candidate resources configured by using the group of control resource sets. Once the terminal device detects the DCI, the terminal device may stop the blind detection.

Similarly, the terminal device may set up or release one or more groups of control resource sets by using a new configuration parameter. A person skilled in the art may perform corresponding modification according to the foregoing examples. The examples are not listed one by one herein.

It should be noted that, in an example instead of a limitation, because complexity of the blind detection performed by the terminal device cannot be too high, a quantity of pieces of DCI specific to the terminal device may be set to two at most. Therefore, there are only two groups of control resource sets in PDCCH-Config at most. In this case, the CORESET group ID may not be set in this embodiment of this application. In this embodiment of this application, two CORESET groups may be directly set, for example, a CORESET group 1 and a CORESET group 2. Therefore, the configuration parameter (for example, PDCCH-Config) may be used to set up or release the CORESET group 1, or the configuration parameter may be used to set up or release the CORESET group 2. Because there are only two groups of control resource sets, the two groups of control resource sets can be distinguished from each other without IDs to be set for the two groups additionally.

For example, when the terminal device is in a single-station transmission scenario, the configuration parameter may be used to set up the CORESET group 1. When the single-station transmission scenario is switched to a joint transmission scenario, the configuration parameter may be used to set up the CORESET group 2. In this case, after completing setting up the control resource set, the terminal device obtains the CORESET group 1 and the CORESET group 2 in total. When the terminal device is switched to the joint transmission scenario to the single-station transmission, the configuration parameter may be used to release the CORESET group 1 or the CORESET group 2. In this way, after releasing the control resource set, the terminal device obtains a CORESET group that is not released in the CORESET group 1 and the CORESET group 2.

Therefore, in this embodiment of this application, the CORESET group ID does not need to be additionally set, thereby reducing signaling overheads.

Case 3:

The configuration parameter is used to configure one or more groups of search spaces. After completing setting up the search space, the terminal device obtains at least one group of search spaces in total.

Alternatively,

The configuration parameter is used to release one or more groups of search spaces. After completing releasing the search space, the terminal device obtains at least one group of search spaces in total.

Each group of search spaces is used to configure one group of candidate resources.

For example, the configuration parameter may be PDCCH-Config. For example, the network side device configures PDCCH-Config by using BWP-DownlinkDedicated, and PDCCH-Config may be configured with a plurality of groups of search spaces (a group of search spaces may also be referred to as a search space group (search space group)). The group of search spaces may include one or more search spaces or index numbers of search spaces. Each group of search spaces is used to configure one group of candidate resources, and each group of search spaces may correspond to one network device. The DCI sent by the network device is carried on the group of candidate resources configured by using the group of search spaces.

It should be understood that, in this embodiment of this application, different groups of search spaces may correspond to different network devices, or different groups of search spaces may correspond to a same network device. This embodiment of this application is not limited thereto.

When different groups of search spaces correspond to different network devices, different pieces of DCI come from different network devices.

When two or more different groups of search spaces correspond to a same network device, two or more pieces of DCI corresponding to the two or more groups of search spaces come from the same network device.

Usually, in an existing solution, for both a single piece of DCI and a plurality of pieces of DCI, one PDCCH-Config parameter is used to configure one group of candidate resources. Because the terminal device does not know a quantity of pieces of DCI, accuracy of blind detection of DCI can be ensured only after blind detection is performed on all candidate resources. In this embodiment of this application, one PDCCH-Config parameter may be used to configure one or more groups of candidate resources. Each group of candidate resources carries only one piece of DCI. Therefore, once the terminal device blindly detects DCI on each group of candidate resources, the terminal device may stop the blind detection on the group of candidate resources, thereby avoiding blind detection on remaining resources, reducing complexity of the blind detection, and improving network performance.

Usually, when there are a plurality of pieces of DCI, the network device may set Search space group IDs to distinguish between the plurality of pieces of DCI. Specifically, different pieces of DCI correspond to different values of the Search space group IDs. For example, when there are N Search space groups, a value of the Search space group ID may be set to 1 to N or the like in this embodiment of this application. Herein, N is a positive integer greater than or equal to 1. For another example, in this embodiment of this application, the network device may set different values of the Search space group IDs by using a form of a table. For example, different Search space groups correspond to different Search space group ID indexes. In the embodiments, this embodiment of this application is not limited thereto.

Specifically, in this embodiment of this application, information exchange may be performed between a plurality of network devices by using a non-ideal backhaul (non-ideal backhaul, NIB). One or more groups of search spaces may be delivered by using PDCCH-Config. Different network devices use different groups of search spaces (search space group). Different Search space groups may correspond to different Search space group IDs. Different Search space groups correspond to different candidate resources.

For example, when the terminal device is in a single-station transmission mode, the network side device generates and sends the configuration parameter. For example, the configuration parameter may be used to set up a Search space group, for example, a Search space group 1. In other words, a Search space group ID=1. Because the terminal device obtains only one Search space group, the terminal device blindly detects DCI on only one group of candidate resources configured by using the Search space group. Once the terminal device detects the DCI, the terminal device may stop the blind detection.

When the terminal device is switched from the single-station transmission mode to a two-station joint transmission mode, the network side device generates a new configuration parameter and sends the new configuration parameter. For example, the configuration parameter may be used to set up a Search space group, for example, a Search space group 2. In other words, a Search space group ID=2. In this way, after completing setting up the search space, the terminal device obtains two groups of search spaces in total, that is, the Search space group 1 and the Search space group 2. Then, the terminal device may separately blindly detect DCI on two groups of candidate resources configured by using the two Search space groups. Once the terminal device detects the DCI on each group of candidate resources, the terminal device may stop the blind detection.

It should be understood that the network device in the two-station joint transmission mode that generates the new configuration parameter and the network device in the single-station transmission mode that generates the configuration parameter may be a same device or may be different devices. This embodiment of this application is not limited thereto. In addition, in this embodiment of this application, the network device that generates the configuration parameter and the network device that sends the configuration parameter may be a same network device or may be different network devices. This embodiment of this application is not limited thereto.

Then, when the terminal device is switched from the two-station transmission mode to a multi-station joint transmission mode, the network side device generates a new configuration parameter and sends the new configuration parameter. For example, the new configuration parameter may be used to set up a group of search spaces, for example, a Search space group 3. In other words, a Search space group ID=3. In this case, after completing setting up the search space, the terminal device obtains three groups of search spaces in total. Then, the terminal device may separately blindly detect DCI on three groups of candidate resources configured by using the three groups of search spaces. Once the terminal device detects the DCI on each group of candidate resources, the terminal device may stop the blind detection. Alternatively, the new configuration parameter may be used to set up a plurality of groups of search spaces, for example, a Search space group 3, . . . , and a Search space group N. In this way, after completing setting up the search space, the terminal device obtains N groups of search spaces in total. Then, the terminal device may separately blindly detect DCI on N groups of candidate resources configured by using the N groups of search spaces. Once the terminal device detects the DCI on each group of candidate resources, the terminal device may stop the blind detection.

Alternatively, when the terminal device is switched from the two-station transmission mode to a single-station joint transmission mode, the network side device generates a new configuration parameter and sends the new configuration parameter. For example, the new configuration parameter may be used to release a group of control resource sets, for example, a Search space group 1. In other words, a Search space group ID=1. In this case, after completing releasing the group of search spaces, the terminal device obtains one group of search spaces in total, that is, a Search space group 2. Because the terminal device obtains only one group of search spaces, the terminal device blindly detects DCI on one group of candidate resources configured by using the group of search spaces. Once the terminal device detects the DCI, the terminal device may stop the blind detection.

Similarly, the terminal device may set up or release one or more groups of search spaces by using a new configuration parameter. A person skilled in the art may perform corresponding modification according to the foregoing examples. The examples are not listed one by one herein.

It should be noted that, in an example instead of a limitation, because complexity of the blind detection performed by the terminal device cannot be too high, a quantity of pieces of DCI specific to the terminal device may be set to two at most. Therefore, there are only two groups of search spaces in PDCCH-Config at most. In this case, the Search space group ID may not be set in this embodiment of this application. In this embodiment of this application, two Search space groups may be directly set, for example, a Search space group 1 and a Search space group 2. Therefore, the configuration parameter (for example, PDCCH-Config) may be used to set up or release the Search space group 1, or the configuration parameter may be used to set up or release the Search space group 2. Because there are only two groups of search spaces, the two groups of search spaces can be distinguished from each other without IDs to be set for the two groups additionally.

For example, when the terminal device is in a single-station transmission scenario, the configuration parameter may be used to set up the Search space group 1. When the single-station transmission scenario is switched to a joint transmission scenario, the configuration parameter may be used to set up the Search space group 2. In this case, after completing setting up the search space, the terminal device obtains the Search space group 1 and the Search space group 2 in total. When the terminal device is switched from the joint transmission scenario to the single-station transmission, the configuration parameter may be used to release the Search space group 1 or the Search space group 2. In this way, after releasing the search space, the terminal device obtains a Search space group that is not released in the Search space group 1 and the Search space group 2.

Therefore, in this embodiment of this application, the Search space group ID does not need to be additionally set, thereby reducing signaling overheads.

Case 4:

Cases 1 to 3 in the foregoing describe a case in which there is one BWP-DownlinkDedicated parameter regardless of whether there is one piece of DCI or two pieces of DCI.

Optionally, in this embodiment of this application, a quantity of BWP-DownlinkDedicated parameters may be set to correspond to a quantity of pieces of DCI. For example, in an optional embodiment, the configuration parameter includes at least one BWP-DownlinkDedicated parameter. Each BWP-DownlinkDedicated is used to configure one group of candidate resources. Each group of candidate resources carries one piece of DCI. Each BWP-DownlinkDedicated may correspond to one network device. DCI sent by the network device is carried on the group of candidate resources configured by using BWP-DownlinkDedicated.

It should be understood that, in this embodiment of this application, different BWP-DownlinkDedicated parameters may correspond to different network devices, or different BWP-DownlinkDedicated parameters may correspond to a same network device. This embodiment of this application is not limited thereto.

When different BWP-DownlinkDedicated parameters correspond to different network devices, different pieces of DCI come from different network devices. Each network device is configured to send one piece of DCI.

When two or more different BWP-DownlinkDedicated parameters correspond to a same network device, two or more pieces of DCI corresponding to the two or more BWP-DownlinkDedicated parameters come from the same network device. In this case, it indicates that the same network device sends the two or more pieces of DCI in a period of time, for example, in at least one slot (slot).

Usually, in an existing solution, for both a single piece of DCI and a plurality of pieces of DCI, the network device sends only one BWP-DownlinkDedicated parameter, and the BWP-DownlinkDedicated parameter is used to configure one group of candidate resources. Because the terminal device does not know a quantity of pieces of DCI, accuracy of blind detection of DCI can be ensured only after blind detection is performed on all candidate resources. In this embodiment of this application, the configuration parameter may include one or more BWP-DownlinkDedicated parameters. One BWP-DownlinkDedicated parameter is used to configure one group of candidate resources. Each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

Specifically, in this embodiment of this application, how many network devices send DCI indicates how many BWP-DownlinkDedicated parameters are received by the terminal device. Once the terminal device blindly detects DCI on a group of candidate resources configured by using each BWP-DownlinkDedicated, the terminal device may stop the blind detection on the group of candidate resources, thereby avoiding blind detection on remaining resources, reducing complexity of the blind detection, and improving network performance.

It should be understood that, in actual application, when the network side device needs to send a plurality of BWP-DownlinkDedicated parameters, the plurality of BWP-DownlinkDedicated parameters may be sent by one network device, or may be separately sent by a plurality of network devices. This is not limited in this embodiment of this application.

The foregoing describes a case in which there are several pieces of DCI, the network side device configures several groups of candidate resources, and each group of candidate resources carries one piece of DCI.

Alternatively, in an implementation, the network side device may configure several groups of candidate resources, and each group of candidate resources may carry one piece of DCI. In this embodiment of this application, an active state or an inactive state may be set in each group of candidate resources. The active state is used to indicate that one piece of DCI is carried on the group of candidate resources, and the inactive state is used to indicate that no DCI is carried on the group of candidate resources. For example, in this embodiment of this application, one piece of indication information may be set in a configuration parameter of each group of candidate resources. The indication information is used to indicate whether a state of the group of candidate resources is the active state or the inactive state. For example, the indication information is 1 bit. When a value of the indication information is 1, it indicates the active state; or when a value of the indication information is 0, it indicates the inactive state. Specifically, the indication information may be carried in BWP-DownlinkDedicated, PDCCH-Config, the CORESET group, or the search space (search space, SS) group. This embodiment of this application is not limited thereto. When the group of candidate resources is in the active state, the terminal device stops the blind detection on the group of candidate resources after the terminal device blindly detects the DCI on the group of candidate resources, and does not need to continue the blind detection on remaining resources on the group of candidate resources. When the group of candidate resources is in the inactive state, the terminal device does not need to perform the blind detection on the candidate resources. In this embodiment of this application, blind detection efficiency can be improved.

Alternatively, in an implementation, regardless of a quantity of pieces of DCI, the network side device may configure only one group of candidate resources by using the configuration parameter.

For example, the network side device generates the configuration parameter, and sends the configuration parameter to the terminal device. The configuration parameter is used to configure the group of candidate resources, and the configuration parameter includes first indication information used to indicate a quantity of pieces of DCI. The terminal device blindly detects the DCI on the group of candidate resources based on the first indication information.

The configuration parameter may be BWP-DownlinkDedicated, or may be PDCCH-Config. This embodiment of this application is not limited thereto.

It should be understood that the first indication information may be carried in BWP-DownlinkDedicated, PDCCH-Config, the CORESET, or the search space (search space, SS). This embodiment of this application is not limited thereto.

Specifically, in this embodiment of this application, information exchange may be performed between a plurality of network devices by using a non-ideal backhaul (non-ideal backhaul, NIB), to effectively distinguish time domain/frequency domain/space domain and determine a value status of the first indication information in the configuration parameter. For example, the first indication information may be a parameter x. When the value status of the parameter is enable (enable), it may indicate that there are a plurality of pieces of DCI on the group of candidate resources. When the value status of the parameter is disable (disable), it may indicate that there is one piece of DCI on the group of candidate resources. In this case, the parameter x may be 1 bit, for example, 1 indicates that the value status is enable, and 0 indicates that the value status is disable.

The terminal device detects a corresponding quantity of pieces of DCI on the group of candidate resources based on a value of the first indication information. For example, the first indication information indicates that there are a plurality of pieces of DCI. Because the terminal device only knows that there are a plurality of pieces of DCI but does not know a specific quantity of pieces of DCI, in this case, the terminal device needs to perform detection on all resources. When the first indication information indicates that there is one piece of DCI, the terminal device may stop detection when the terminal device detects one piece of DCI, thereby avoiding blind detection on remaining resources, reducing complexity of the blind detection, and improving network performance.

It should be noted that, in an example instead of a limitation, because complexity of blind detection performed by the terminal device cannot be too high, a quantity of pieces of DCI specific to the terminal device may be set to two at most. In this case, the first indication information has only two values. Therefore, in this embodiment of this application, when the value status of the parameter is enable (enable), it may indicate that there are two pieces of DCI on the group of candidate resources; or when the value status of the parameter is disable (disable), it may indicate that there is one piece of DCI on the group of candidate resources. In this case, the parameter x may be 1 bit. For example, 1 indicates that the value status is enable, and 0 indicates that the value status is disable. The terminal device detects a corresponding quantity of pieces of DCI on the group of candidate resources based on the value of the first indication information. For example, when the first indication information indicates that there are two pieces of DCI, the terminal device may stop the blind detection after the terminal device detects the two pieces of DCI. When the first indication information indicates that there is one piece of DCI, the terminal device may stop the detection when the terminal device detects one piece of DCI, thereby avoiding blind detection on remaining resources, reducing complexity of the blind detection, and improving network performance.

Alternatively, for another example, a value of the first indication information may indicate a quantity (for example, may be a maximum quantity or an actual quantity) of pieces of DCI. For example, the first indication information may be a parameter x, and a value of x is equal to the maximum quantity of pieces of DCI. For example, when the value of x is 2, it indicates that there are two pieces of DCI on the group of resources at most. Alternatively, the value of x is equal to the actual quantity of pieces of DCI. When the value of x is 2, it indicates that there are two pieces of DCI on the group of resources.

The terminal device detects a corresponding quantity of pieces of DCI on the group of candidate resources based on the value of the first indication information. For example, when the first indication information indicates that there are three pieces of DC at most (or in practice), the terminal device may stop the blind detection after the terminal device detects the three pieces of DCI, thereby avoiding blind detection on remaining resources, reducing complexity of the blind detection, and improving network performance.

It should be noted that the foregoing embodiment describes a case in which the first indication information may be located in the configuration parameter. Optionally, the first indication information may also be independent, for example, sent by using separate signaling. In other words, the first indication information and the configuration parameter used to configure a candidate resource are two independent parameters. This embodiment of this application is not limited thereto.

220. The network side device sends the configuration parameter.

Correspondingly, the terminal device receives the configuration parameter.

Specifically, the network side device (for example, any network device that communicates with the terminal device) sends the configuration information by using higher layer signaling, for example, radio resource control (radio resource control, RRC) signaling or medium access control (medium access control, MAC) signaling. Alternatively, the network side device may send the configuration parameter by using other signaling. This is not specifically limited herein.

It should be understood that, in this embodiment of this application, the network device that generates the configuration parameter and the network device that sends the configuration parameter may be a same network device or may be different network devices. This embodiment of this application is not limited thereto.

230. The terminal device blindly detects the DCI.

Specifically, the terminal device blindly detects the DCI based on the configuration parameter.

Specifically, for Cases 1 to 4 in the foregoing, after detecting one piece of DCI on each group of candidate resources, the terminal device stops the blind detection on the group of candidate resources. Therefore, in this embodiment of this application, blind detection on remaining resources can be avoided, complexity of the blind detection can be reduced, and network performance can be improved.

When the network side device sends the first indication information, in this embodiment of this application, the terminal device may blindly detect the DCI on the group of candidate resources based on the value of the first indication information. For a specific process, refer to the foregoing description. Details are not described herein again.

It should be understood that the foregoing examples in FIG. 1 and FIG. 2 are merely used to help a person skilled in the art understand the embodiments of this application, but are not intended to limit the embodiments of this application to a specific value or a specific scenario in the examples. Apparently, a person skilled in the art can make various equivalent modifications or changes based on the examples shown in FIG. 1 and FIG. 2, and such modifications or changes also fall within the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes in detail the method in the embodiments of this application with reference to FIG. 1 and FIG. 2. The following describes in detail a communications apparatus in the embodiments of this application with reference to FIG. 3 to FIG. 6.

Figure 3:
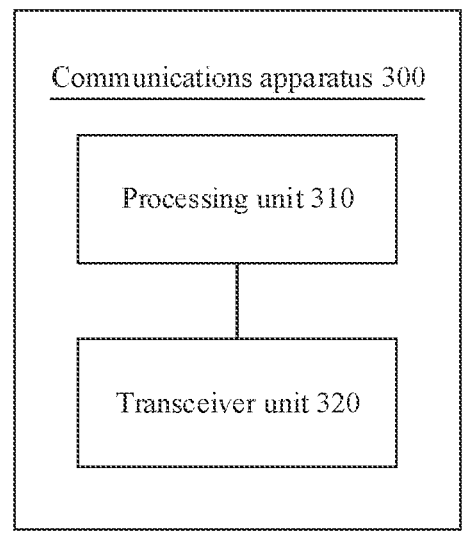
FIG. 3 is a schematic block diagram of a communications apparatus according to this application.

FIG. 3 is a schematic structural diagram of a communications apparatus according to an embodiment of this application. The communications apparatus 300 may include:

a processing unit 310 and a transceiver unit 320.

The transceiver unit is configured to receive a configuration parameter. The configuration parameter is used to configure at least one group of candidate resources, and each group of candidate resources carries one piece of DCI.

The processing unit is configured to: when one piece of DCI is blindly detected from each group of candidate resources, stop the blind detection on the group of candidate resources.

Optionally, the configuration parameter is used to set up one or more downlink control channel configurations;

or the configuration parameter is used to release one or more downlink control channel configurations.

Each downlink control channel configuration is used to configure one group of candidate resources.

Optionally, the configuration parameter is used to configure one or more groups of control resource sets;

or the configuration parameter is used to release one or more groups of control resource sets.

Each group of control resource sets is used to configure one group of candidate resources.

Optionally, the configuration parameter is used to set up one or more groups of search spaces:

or the configuration parameter is used to release one or more groups of search spaces.

Each group of search spaces is used to configure one group of candidate resources.

The communications apparatus 300 provided in this application corresponds to a process performed by the terminal device in the foregoing method embodiment in FIG. 2. For functions of units/modules in the communications apparatus, refer to the foregoing descriptions. Details are not described herein again.

In this embodiment of this application, candidate resources are grouped by using the configuration parameter, and each group of candidate resources carries only one piece of DCI. Therefore, once the terminal device blindly detects DCI on each group of candidate resources, the terminal device may stop the blind detection on the group of candidate resources, thereby avoiding blind detection on remaining resources, reducing complexity of the blind detection, and improving network performance.

It should be understood that the communications apparatus described in FIG. 3 may be a terminal device, or a chip or an integrated circuit installed in a terminal device.

Figure 4:
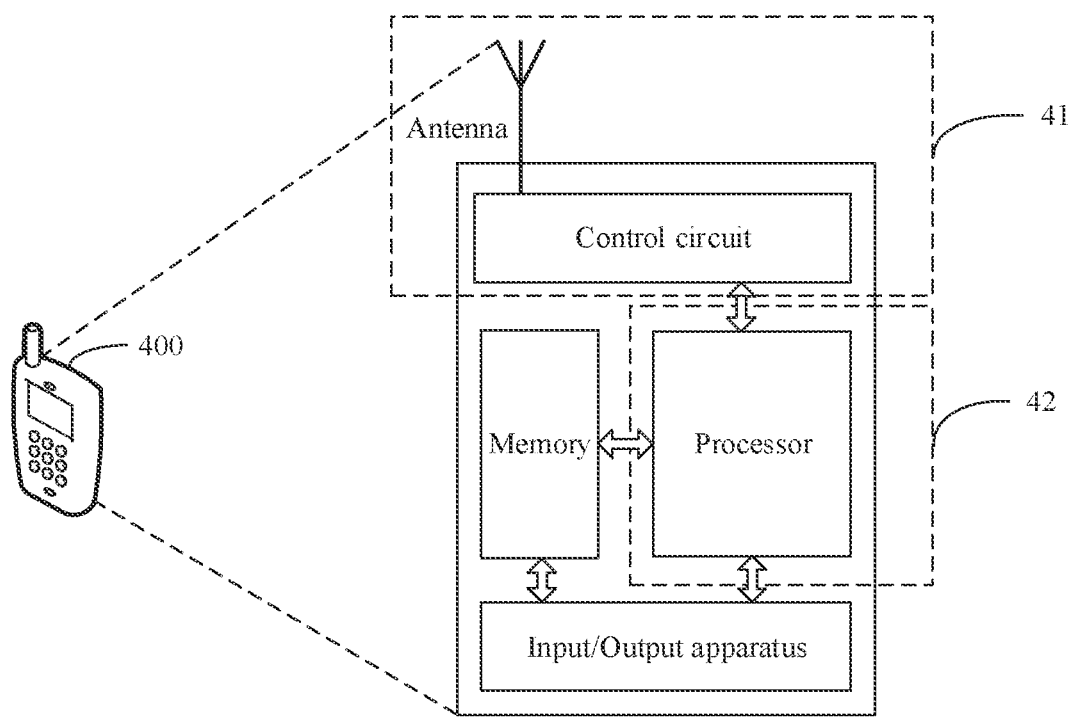
FIG. 4 is a schematic block diagram of a terminal device according to this application.

In an example of using the communications apparatus as the terminal device, FIG. 4 is a schematic structural diagram of a terminal device according to an embodiment of this application. For ease of understanding and illustration, FIG. 4 shows an example in which the terminal device is a mobile phone. FIG. 4 shows merely main parts of the terminal device. As shown in FIG. 4, the terminal device 400 includes a processor, a memory, a control circuit, an antenna, and an input/output apparatus. The processor is mainly configured to: process a communications protocol and communication data, control the entire terminal device, execute a software program, and process data of the software program, for example, configured to support the terminal device in performing the actions described in the foregoing method embodiment. The memory is mainly configured to store a software program and data. The control circuit is mainly configured to: perform conversion between a baseband signal and a radio frequency signal, and process the radio frequency signal. The control circuit and the antenna may be integrated into a transceiver that is mainly configured to receive/send a radio frequency signal in an electromagnetic wave form. The input/output apparatus such as a touchscreen, a display screen, or a keyboard is mainly configured to: receive data entered by a user, and output data to the user.

After the terminal device is powered on, the processor may read a software program in a storage unit, explain and execute an instruction of the software program, and process data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor; and the processor converts the baseband signal into data, and processes the data.

A person skilled in the art may understand that for ease of description, FIG. 4 shows only one memory and one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data. The central processing unit is mainly configured to, control the entire terminal device, execute a software program, and process data of the software program. Functions of the baseband processor and the central processing unit may be integrated into the processor in FIG. 4. A person skilled in the art may understand that the baseband processor and the central processing unit may be alternatively processors independent of each other, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and various parts of the terminal device may be connected by using various buses. The baseband processor may also be expressed as a baseband processing circuit or a baseband processing chip. The central processing unit may also be expressed as a central processing circuit or a central processing chip. A function of processing a communications protocol and communication data may be built into the processor, or may be stored in a storage unit in a form of a software program, so that the processor executes the software program to implement a baseband processing function.

In this embodiment of the present invention, an antenna and a control circuit that have receiving and sending functions may be considered as a transceiver unit 41 of the terminal device 400. For example, the transceiver unit 41 is configured to support the terminal device in performing receiving and sending functions performed by the terminal device in the method embodiment in FIG. 2. The processor that has a processing function is considered as a processing unit 42 of the terminal device 400. The processing unit 42 corresponds to the processing unit 310 in FIG. 3. As shown in FIG. 4, the terminal device 400 includes the transceiver unit 41 and the processing unit 42. The transceiver unit may also be referred to as a transceiver, a transceiver, a transceiver apparatus, or the like. The transceiver unit corresponds to the transceiver unit 320 in FIG. 3. Optionally, a component that is in the transceiver unit 41 and that is configured to implement a receiving function may be considered as a receiving unit, and a component that is in the transceiver unit 41 and that is configured to implement a sending function may be considered as a sending unit. In other words, the transceiver unit 41 includes the receiving unit and the sending unit. The receiving unit may also be referred to as a receiver, an input port, a receiver circuit, or the like, and the sending unit may be referred to as a transmitter, a transmitter, a transmitter circuit, or the like.

The processing unit 42 may be configured to execute an instruction stored in the memory, to control the transceiver unit 41 to receive a signal and/or send a signal, and complete a function of the terminal device in the foregoing method embodiment. In an implementation, a function of the transceiver unit 41 may be implemented by using a transceiver circuit or a dedicated transceiver chip.

It should be understood that the terminal device 400 shown in FIG. 4 can implement processes related to the terminal device in the method embodiment in FIG. 2. Operations and/or functions of each module in the terminal device 400 are respectively used to implement the corresponding procedures in the foregoing method embodiment. For details, refer to the descriptions in the method embodiment. To avoid repetition, detailed descriptions are appropriately omitted herein.

Figure 5:
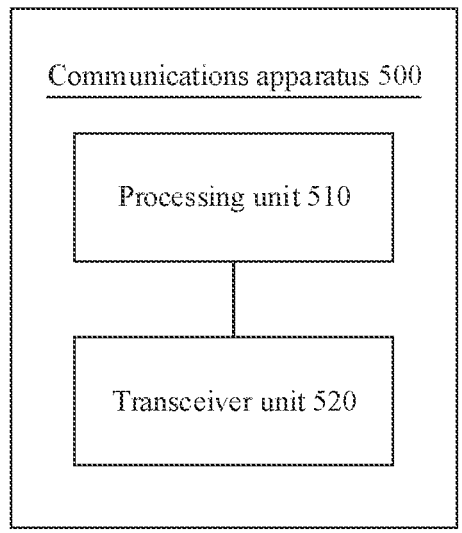
FIG. 5 is a schematic block diagram of another communications apparatus according to this application.

FIG. 5 is a schematic structural diagram of a communications apparatus according to an embodiment of this application. The apparatus 500 may include:

a processing unit 510 and a transceiver unit 520.

Specifically, the processing unit is configured to generate a configuration parameter. The configuration parameter is used to configure at least one group of candidate resources, and each group of candidate resources carries one piece of DCI.

The transceiver unit is configured to send the configuration parameter to a terminal device.

Optionally, the configuration parameter is used to set up one or more downlink control channel configurations;

or the configuration parameter is used to release one or more downlink control channel configurations.

Each downlink control channel configuration is used to configure one group of candidate resources.

Optionally, the configuration parameter is used to configure one or more groups of control resource sets;

or the configuration parameter is used to release one or more groups of control resource sets.

Each group of control resource sets is used to configure one group of candidate resources.

Optionally, the configuration parameter is used to set up one or more groups of search spaces:

or the configuration parameter is used to release one or more groups of search spaces.

Each group of search spaces is used to configure one group of candidate resources.

The communications apparatus 500 provided in this application corresponds to a process performed by the network device in the foregoing method embodiment in FIG. 2. For functions of units/modules in the communications apparatus, refer to the foregoing descriptions. Details are not described herein again.

In this embodiment of this application, candidate resources are grouped by using the configuration parameter, and each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

It should be understood that the communications apparatus described in FIG. 5 may be a network side device, or a chip or an integrated circuit installed in a network side device.

It should be understood that the network side device may indicate any network device that communicates with the terminal device, or may indicate a whole of a plurality of network devices that communicate with the terminal device. This embodiment of this application is not limited thereto.

Figure 6:
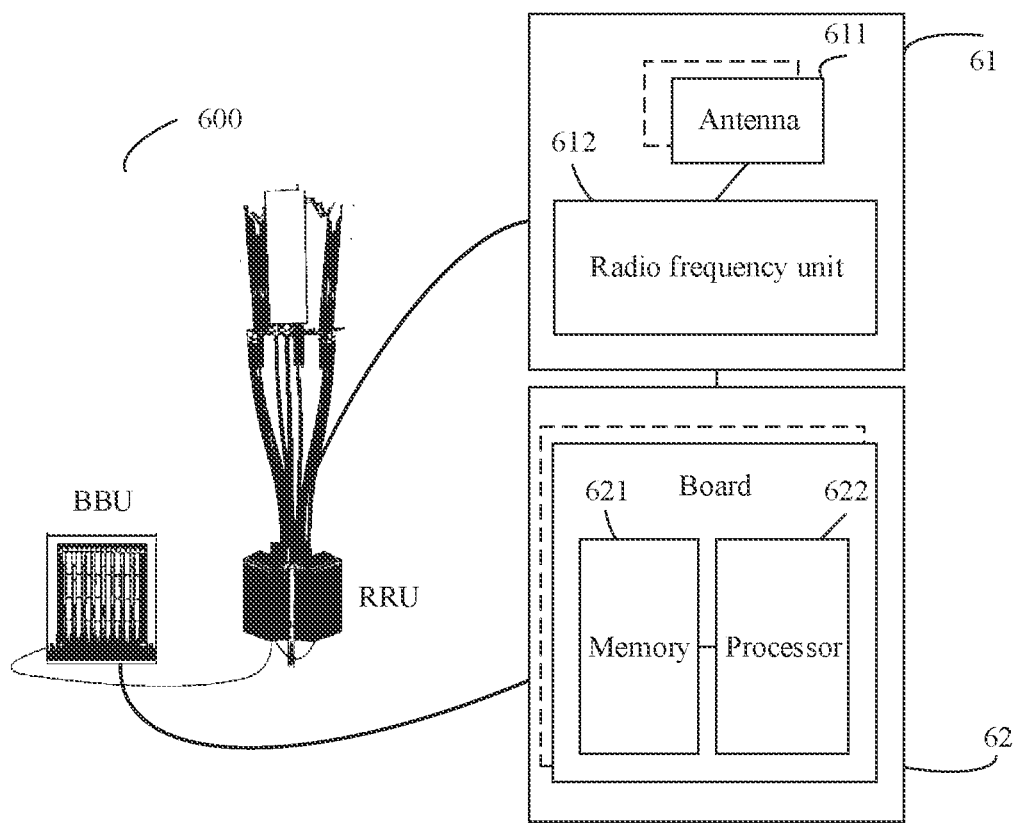
FIG. 6 is a schematic block diagram of a network device according to this application.

In an example of using the communications apparatus as a network device that communicates with a terminal device, FIG. 6 is a schematic structural diagram of a network device according to an embodiment of this application, for example, may be a schematic structural diagram of a base station. As shown in FIG. 6, the network device 600 may be used in the system shown in FIG. 1, to implement a function of the network device in the foregoing method embodiment.

The network device 600 may include one or more radio frequency units, such as a remote radio unit (remote radio unit, RRU) 61 and one or more baseband units (baseband unit, BBU) (also referred to as a digital unit (digital unit, DU)) 62. The RRU 61 may be referred to as a transceiver unit 61 corresponding to the transceiver unit 520 in FIG. 5. Optionally, the transceiver unit may also be referred to as a transceiver, a transceiver circuit, a transceiver, or the like. The transceiver unit may include at least one antenna 611 and a radio frequency unit 612. The RRU 61 is mainly configured to: receive and send a radio frequency signal, and perform conversion between a radio frequency signal and a baseband signal, for example, configured to send precoding matrix information to a terminal device. The BBU 62 is mainly configured to: perform baseband processing, control a base station, and the like. The RRU 61 and the BBU 62 may be physically disposed together, or may be physically separated, namely, a distributed base station.

The BBU 62 is a control center of the base station, or may be referred to as a processing unit 62 corresponding to the processing unit 510 in FIG. 5, which is mainly configured to complete a baseband processing function, such as channel encoding, multiplexing, modulation, spectrum spreading, or the like. For example, the BBU (the processing unit) may be configured to control the base station to perform an operation procedure related to the network device in the foregoing method embodiment.

In an example, the BBU 62 may include one or more boards, and a plurality of boards may jointly support a radio access network (such as an LTE network) of a single access standard, or may separately support radio access networks (such as an LTE network, a 5G network, or another network) of different access standards. The BBU 62 further includes a memory 621 and a processor 622. The memory 621 is configured to store necessary instructions and data. The processor 622 is configured to control the base station to perform a necessary action, for example, configured to control the base station to perform an operation procedure related to the network device in the foregoing method embodiment. The memory 621 and the processor 622 may serve one or more boards. In other words, a memory and a processor may be separately disposed on each board, or a plurality of boards may share a same memory and processor. In addition, a necessary circuit may be disposed on each board.

It should be understood that the network device 600 shown in FIG. 6 can implement processes related to the network device in the method embodiment in FIG. 2. Operations and/or functions of each module in the network device 600 are respectively used to implement the corresponding procedures in the foregoing method embodiment. For details, refer to the descriptions in the method embodiment. To avoid repetition, detailed descriptions are appropriately omitted herein.

An embodiment of this application further provides a processing apparatus, including a processor and an interface. The processor is configured to perform the communication method in any one of the foregoing method embodiments.

It should be understood that the foregoing processing apparatus may be a chip. For example, the processing apparatus may be a field programmable gate array (field programmable gate array, FPGA), may be an application-specific integrated circuit (application-specific integrated circuit, ASIC), may be a system on chip (system on chip, SoC), may be a central processing unit (central processing unit, CPU), may be a network processor (network processor, NP), may be a digital signal processing circuit (digital signal processor, DSP), may be a micro controller (micro control unit, MCU), or may be a programmable controller (programmable logic device, PLD) or another integrated chip.

In an implementation process, steps in the foregoing methods can be implemented by using an integrated logic circuit of hardware in a processor, or by using an instruction in a form of software. Steps of the method disclosed with reference to the embodiments of this application may be directly performed and completed by a hardware processor, or may be performed and completed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in the memory. The processor reads information from the memory, and completes the steps of the foregoing methods in combination with the hardware. To avoid repetition, details are not described herein again.

It should be understood that the processor in this embodiment of this application may be an integrated circuit chip, and has a signal processing capability. In an implementation process, steps in the foregoing method embodiments can be implemented and completed by using a hardware integrated logic circuit in the processor, or by using instructions in a form of software. The foregoing processor may be a general purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor, or the like. The steps of the methods disclosed with reference to the embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information from the memory, and completes the steps of the foregoing methods in combination with the hardware.

It may be understood that the memory in this embodiment of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) used as an external cache. In an example rather than a limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct Rambus RAM, DR RAM). It should be noted that the memory in the systems and methods described in this specification includes but is not limited to these and any memory of another appropriate type.

Figure 7:
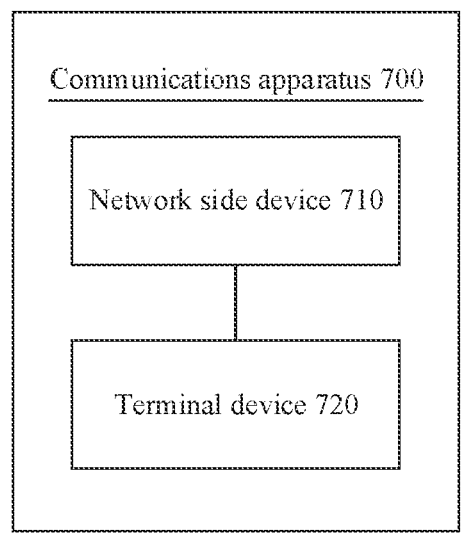
FIG. 7 is a schematic block diagram of a communication system according to this application.

FIG. 7 is a schematic diagram of a communications system according to an embodiment of this application. The communications system 700 includes a network side device 710 and a terminal device 720. The network side device includes at least two network devices.

The network side device is configured to generate a configuration parameter. The configuration parameter is used to configure at least one group of candidate resources, and each group of candidate resources carries one piece of DCI.

The network side device is further configured to send the configuration parameter to the terminal device.

The terminal device is configured to: receive the configuration parameter from the at least two network devices, and when the terminal device blindly detects one piece of DCI on each group of candidate resources, stop blind detection.

It should be understood that, in this embodiment of this application, the network side device that generates the configuration parameter may be any network device that communicates with the terminal device. For example, the configuration parameter may be generated by a first network device or a second network device. Optionally, the network side device that generates the configuration parameter may be alternatively a first network device and a second network device. For example, the first network device and the second network device negotiate with each other to generate the configuration parameter. This embodiment of this application is not limited thereto. It should be further understood that, in this embodiment of this application, the network device that sends the configuration parameter and the network device that generates the configuration parameter may be a same network device or may be different network devices. This embodiment of this application is not limited thereto.

Optionally, the configuration parameter is used to set up one or more downlink control channel configurations. After completing setting up the downlink control channel configuration, the terminal device obtains at least one downlink control channel configuration in total. Alternatively, the configuration parameter is used to release one or more downlink control channel configurations. After completing releasing the downlink control channel configuration, the terminal device obtains at least one downlink control channel configuration in total. Each downlink control channel configuration is used to configure one group of candidate resources.

Optionally, the configuration parameter is used to configure one or more groups of control resource sets. After completing configuring the control resource set, the terminal device obtains at least one group of control resource sets in total. Alternatively, the configuration parameter is used to release one or more groups of control resource sets. After completing releasing the control resource set, the terminal device obtains at least one group of control resource sets in total. Each group of control resource sets is used to configure one group of candidate resources.

Optionally, the configuration parameter is used to set up one or more groups of search spaces. After completing setting up the search space, the terminal device obtains at least one group of search spaces in total. Alternatively, the configuration parameter is used to release one or more groups of search spaces. After completing releasing the search space, the terminal device obtains at least one group of search spaces in total. Each group of search spaces is used to configure one group of candidate resources.

Specifically, for descriptions of the network side device and the terminal device, refer to the foregoing descriptions. Details are not described herein again.

In this embodiment of this application, candidate resources are grouped by using the configuration parameter, and each group of candidate resources carries only one piece of DCI. Therefore, once the terminal device blindly detects the DCI on each group of candidate resources, the terminal device may stop the blind detection on the group of candidate resources, thereby avoiding blind detection on remaining resources, reducing complexity of the blind detection, and improving network performance.

An embodiment of this application further provides a computer readable medium. The computer readable medium stores a computer program. The computer program is executed by a computer to implement the method in any method embodiment.

An embodiment of this application further provides a computer program product. The computer program product is executed by a computer to implement the method in any method embodiment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the procedures or functions according to the embodiments of this application are all or partially generated. The computer may be a general purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any available medium accessible to a computer, or a data storage device integrating one or more available media, for example, a server or a data center. The available medium may be a magnetic medium (for example, a floppy disk, a hard disk, or a magnetic tape), an optical medium (for example, a high-density digital video disc (digital video disc, DVD)), a semiconductor medium (for example, a solid-state disk (solid state disk. SSD)), or the like.

It should be understood that the foregoing describes the communication method in downlink transmission in a communications system. However, this application is not limited thereto. Optionally, a similar solution may also be used for uplink transmission. To avoid repetition, details are not described herein again.

It should be understood that "one embodiment" or "an embodiment" mentioned in the entire specification indicates that particular features, structures, or characteristics related to the embodiment are included in at least one embodiment of this application. Therefore, "in an embodiment" or "in one embodiment" appearing throughout this specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that stores various data structures. The components may communicate by using a local and/or remote process according to, for example, a signal having one or more data packets (for example, data from two components interacting with another component in a local system, in a distributed system, and/or across a network, such as the Internet interacting with another system by using a signal).

It should be further understood that first, second, third, fourth, and various numbers in this specification are used for differentiation only for ease of description, instead of limiting the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, with reference to various illustrative logical blocks (illustrative logical block) and steps (step) described in the embodiments disclosed in this specification, this application can be implemented by using electronic hardware or a combination of computer software and electronic hardware. Whether these functions are performed in a hardware manner or in a software manner depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for ease and brevity of description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected according to actual requirements to achieve the purposes of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on the computer, the procedures or functions according to the embodiments of this application are all or partially generated. The computer may be a general purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible to a computer, or a data storage device integrating one or more available media, for example, a server or a data center. The available medium may be a magnetic medium (for example, a floppy disk, a hard disk, or a magnetic tape), an optical medium (for example, a DVD), a semiconductor medium (for example, a solid-state disk Solid State Disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A downlink control information (DCI) detection method, comprising:
receiving a configuration parameter, wherein the configuration parameter is used to configure one or more groups of candidate resources, and wherein each group of candidate resources in the of the one or more groups of candidate resources carries only one piece of DCI; and for each group of candidate resources in the one or more groups of candidate resources:
determining that the one piece of DCI is detected after blind detection on a subset of the candidate resources in the group of candidate resources; and
in response to determining that the one piece of DCI is detected, stopping blind detection on remaining candidate resources in the group of candidate resources.

2. The method according to claim 1, wherein the configuration parameter is used to set up or release one or more downlink control channel configurations, and
wherein each of the one or more downlink control channel configurations is used to configure a corresponding one of the one or more groups of candidate resources.

3. The method according to claim 1, wherein the configuration parameter is used to configure or release one or more groups of control resource sets, and
wherein each of the one or more groups of control resource sets is used to configure a corresponding one of the one or more groups of candidate resources.

4. The method according to claim 1, wherein the configuration parameter is used to set up or release one or more groups of search spaces, and
wherein each of the one or more groups of search spaces is used to configure a corresponding one of the one or more groups of candidate resources.

5. A communications apparatus, comprising:
at least one processor; and
one or more memories coupled to the at least one processor and storing programming instructions for execution by the at least one processor to:
cause a transceiver to receive a configuration parameter, wherein the configuration parameter is used to configure one or more groups of candidate resources, and wherein each group of candidate resources in the of the one or more groups of candidate resources carries only one piece of DCI; and
for each group of candidate resources in the one or more groups of candidate resources:
determining that the one piece of DCI is detected after blind detection on a subset of the candidate resources in the group of candidate resources; and
in response to determining that the one piece of DCI is detected, stopping blind detection on remaining candidate resources in the group of candidate resources.

6. The communications apparatus according to claim 5, wherein the configuration parameter is used to set up or release one or more downlink control channel configurations, and
wherein each of the one or more downlink control channel configurations is used to configure a corresponding one of the one or more groups of candidate resources.

7. The communications apparatus according to claim 5, wherein the configuration parameter is used to configure or release one or more groups of control resource sets, and
wherein each of the one or more groups of control resource sets is used to configure a corresponding one of the one or more groups of candidate resources.

8. The communications apparatus according to claim 5, wherein the configuration parameter is used to set up or release one or more groups of search spaces, and
wherein each of the one or more groups of search spaces is used to configure a corresponding one of the one or more groups of candidate resources.

9. The communications apparatus according to claim 5, wherein the communications apparatus is a terminal device or a chip.

10. A communications apparatus, comprising:
at least one processor; and
one or more memories coupled to the at least one processor and storing programming instructions for execution by the at least one processor to:
generate a configuration parameter, wherein the configuration parameter is used to configure one or more groups of candidate resources, wherein each group of candidate resources in the of the one or more groups of candidate resources carries only one piece of DCI, and wherein the configuration parameter includes indication information that indicates that each group of candidate resources includes only one piece of indication information, and
cause a transceiver to send the configuration parameter to a terminal device.

11. The communications apparatus according to claim 10, wherein the configuration parameter is used to set up or release one or more downlink control channel configurations, and
wherein each of the one or more downlink control channel configurations is used to configure a corresponding one of the one or more groups of candidate resources.

12. The communications apparatus according to claim 10, wherein the configuration parameter is used to configure or release one or more groups of control resource sets, and
wherein each of one or more groups of control resource sets is used to configure a corresponding one of the one or more groups of candidate resources.

13. The communications apparatus according to claim 10, wherein the configuration parameter is used to set up or release one or more groups of search spaces, and
wherein each of the one or more groups of search spaces is used to configure a corresponding one of the one or more groups of candidate resources.

14. The communications apparatus according to claim 10, wherein the communications apparatus is a network device or a chip.

* * * * *